(12) United States Patent
Kaneda et al.

(10) Patent No.: US 11,906,769 B2
(45) Date of Patent: Feb. 20, 2024

(54) OPTICAL SYSTEM WITH POLARIZATION ELEMENTS AND MULTIPLE LIGHT VALVES

(71) Applicant: SONY GROUP CORPORATION, Tokyo (JP)

(72) Inventors: Kazumasa Kaneda, Tokyo (JP); Koji Miura, Tokyo (JP)

(73) Assignee: Sony Group Corporation, Tokyo (JP)

(*) Notice: Subject to any disclaimer, the term of this patent is extended or adjusted under 35 U.S.C. 154(b) by 0 days.

(21) Appl. No.: 17/792,802

(22) PCT Filed: Jan. 7, 2021

(86) PCT No.: PCT/JP2021/000346
§ 371 (c)(1),
(2) Date: Jul. 14, 2022

(87) PCT Pub. No.: WO2021/149499
PCT Pub. Date: Jul. 29, 2021

(65) Prior Publication Data
US 2023/0040080 A1 Feb. 9, 2023

(30) Foreign Application Priority Data
Jan. 22, 2020 (JP) .................. 2020-008634

(51) Int. Cl.
*G02B 5/30* (2006.01)
*G02B 5/00* (2006.01)

(52) U.S. Cl.
CPC ........... *G02B 5/3066* (2013.01); *G02B 5/006* (2013.01)

(58) Field of Classification Search
CPC ........ G02B 5/3066; G02B 5/006; G02B 5/30; G02B 5/3025; G02B 5/3083; G02B 27/28;
(Continued)

(56) References Cited

U.S. PATENT DOCUMENTS 6,924,893 B2 * 8/2005 Oldenbourg ....... G02B 21/0092
356/369
2010/0214500 A1 8/2010 Kimura
(Continued)

FOREIGN PATENT DOCUMENTS

JP 2004-061599 4/1977
JP 2001-324762 11/2001
(Continued)

OTHER PUBLICATIONS

International Search Report and Written Opinion prepared by the Japan Patent Office dated Mar. 12, 2021, for International Application No. PCT/JP2021/000346, 2 pgs.

*Primary Examiner* — Arnel C Lavarias
(74) *Attorney, Agent, or Firm* — Sheridan Ross PC

(57) ABSTRACT

An optical system includes: a first optical system including a polarization conversion element aligning a polarization direction of light including color light beams with a predetermined polarization direction, and generating illumination light including the color light beams; a first polarization rotation element disposed at a first pupil position inside the first optical system, including first and second divided regions, in which the first and second divided regions have different polarization characteristics with respect to a first color light beam outputted from the polarization conversion element; a polarizer disposed between the polarization conversion element and the first polarization rotation element, and reducing light in a polarization direction other than the predetermined polarization direction included in light outputted from the polarization conversion element; and light valves each illuminated by at least the first color light beam included in the illumination light generated by the first optical system.

16 Claims, 22 Drawing Sheets

(58) Field of Classification Search
CPC .. G02B 27/281; G02B 27/283; G02B 27/286; H04N 9/3167; F21V 9/14
USPC ........... 359/485.01, 483.01, 486.01, 486.02, 359/486.03, 489.07, 489.08, 489.15; 353/20; 362/19
See application file for complete search history.

(56) References Cited

U.S. PATENT DOCUMENTS

2022/0100074 A1* 3/2022 Yasui .................... G03B 33/12
2023/0046512 A1* 2/2023 Kaneda ................ G03B 21/204

FOREIGN PATENT DOCUMENTS

| | | |
|---|---|---|
| JP | 2002-131837 | 5/2002 |
| JP | 2006-343721 | 12/2006 |
| JP | 2008-165058 | 7/2008 |
| JP | 2008-176203 | 7/2008 |
| JP | 2009-042316 | 2/2009 |
| JP | 2010-197716 | 9/2010 |
| JP | 2014-191248 | 10/2014 |
| JP | 2018-013655 | 1/2018 |

* cited by examiner

US 11,906,769 B2

OPTICAL SYSTEM WITH POLARIZATION ELEMENTS AND MULTIPLE LIGHT VALVES

CROSS REFERENCE TO RELATED APPLICATIONS

This application is a national stage application under 35 U.S.C. 371 and claims the benefit of PCT Application No. PCT/JP2021/000346, having an international filing date of 7 Jan. 2021, which designated the United States, which PCT application claimed the benefit of Japanese Patent Application No. 2020-008634, filed 22 Jan. 2020, the entire disclosures of each of which are incorporated herein by reference.

TECHNICAL FIELD

The present disclosure relates to an optical system suitable for a projector and the like.

BACKGROUND ART

Examples of types of projectors performing full-color display include a single-plate type using one common light valve for respective color light beams of R (red), G (green), and B (blue), a three-plate type using different light valves for three color light beams, and the like (see PTLs 1 to 4). Meanwhile, when continuously causing blue light having a short wavelength to be incident on one light valve, the light valve is deteriorated. PTL 1 proposes using two light valves for blue light to thereby extend the lives of the light valves.

CITATION LIST

Patent Literature

[PTL 1] Japanese Unexamined Patent Application Publication No. 2018-13655
[PTL 2] Japanese Unexamined Patent Application Publication No. 2001-324762
[PTL 3] Japanese Unexamined Patent Application Publication No. 2008-165058
[PTL 4] Japanese Unexamined Patent Application Publication No. 2006-343721

SUMMARY OF THE INVENTION

For example, in a case where two light valves for blue light are used to extend the lives of the light valves, it is difficult to increase contrast in a configuration in which a blue light beam is simply split into two.

It is desirable to provide an optical system that makes it possible to achieve an improvement in contrast.

An optical system according to an embodiment of the present disclosure includes: a first optical system which includes a polarization conversion element that aligns a polarization direction of light including multiple color light beams with a predetermined polarization direction, and generates illumination light including the multiple color light beams; a first polarization rotation element which is disposed at a first pupil position inside the first optical system and includes a first divided region and a second divided region, and in which the first divided region and the second divided region have polarization characteristics different from each other with respect to a first color light beam of the multiple color light beams outputted from the polarization conversion element; a polarizer which is disposed between the polarization conversion element and the first polarization rotation element inside the first optical system, and reduces light in a polarization direction other than the predetermined polarization direction included in light outputted from the polarization conversion element; and multiple light valves each illuminated by at least the first color light beam of the multiple color light beams included in the illumination light generated by the first optical system.

In the optical system according to an embodiment of the present disclosure, the first polarization rotation element including the first divided region and the second divided region having polarization characteristics different from each other is disposed at the first pupil position in the first optical system, and further the polarizer that reduces light in a polarization direction other than a predetermined polarization direction included in light outputted from the polarization conversion element is disposed inside the first optical system.

MODES FOR CARRYING OUT THE INVENTION

Figure 1:
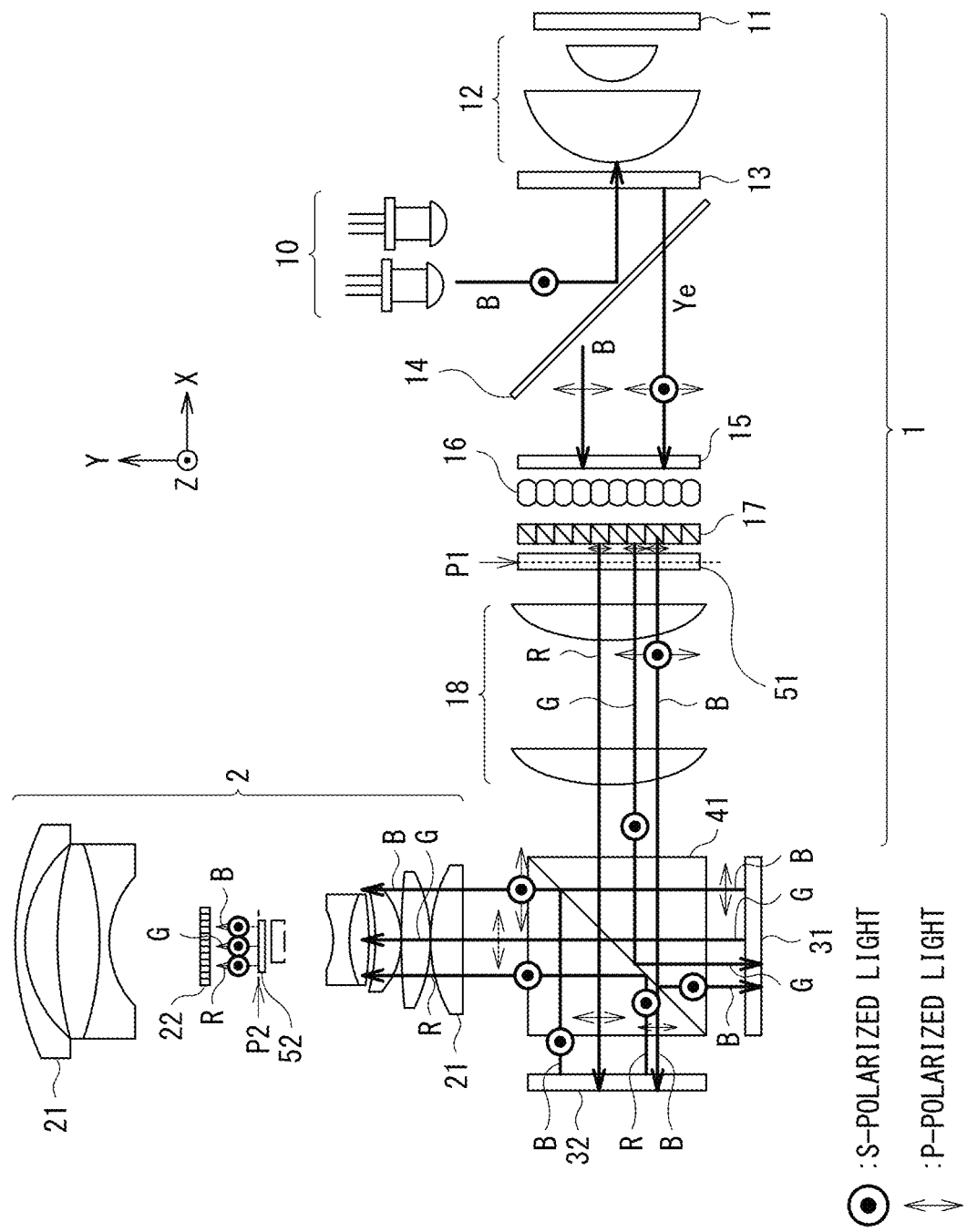
FIG. 1 is a configuration diagram schematically illustrating an overall configuration example of an optical system according to a first embodiment of the present disclosure.

Hereinafter, description is given in detail of embodiments of the present disclosure with reference to the drawings. It is to be noted that the description is given in the following order.
0. Comparative Example
1. First Embodiment (Optical System Including Region-Divided Polarization Rotation Element)
1.1 Configuration and Action of Optical System According to First Embodiment (FIGS. 1 to 4)
1.2 Desirable Configuration Example of Optical System According to First Embodiment (FIG. 5)
1.3 Effects
2. Second Embodiment (Optical System Including Wavelength Selective Reflective Element Reducing Unnecessary Light) (FIGS. 6 to 12)
3. Third Embodiment (Optical System Including Wavelength Selective Reflective Element Reducing Unnecessary Light) (FIGS. 13 to 15)
4. Fourth Embodiment (Optical System Including Absorptive Polarizer Reducing Unnecessary Light) (FIG. 16)
5. Fifth Embodiment (Variation of Divided Structure of Polarization Rotation Element) (FIGS. 17 to 22)
6. Other Embodiments

0. Comparative Example (Overview and Issues of Optical System According to Comparative Example)

In an optical system used for a projector and the like, a configuration including multiple light valves is known. In such an optical system, in a case where illumination light is split for the multiple light valves, an action of either wavelength or polarization is typically used. For example, PTL 1 (Japanese Unexamined Patent Application Publication No. 2018-13655) discloses a configuration example in which a wavelength selective wave plate is used to split light in a blue band for two light valves. This reduces, by half, blue-band light that easily contributes to a deterioration in the light valves, thereby extending the life of the entire optical system.

However, in the configuration example disclosed in PTL 1, it is possible to split light in the blue band for two light valves, but polarized light beams outputted from the respective light valves are orthogonal to each other. This means that it is not possible to increase contrast with use of a post polarizer in a subsequent projection optical system, which causes an issue in achieving high contrast. Meanwhile, it is possible to provide a similar configuration by using a dichroic mirror or a dichroic prism in place of the wavelength selective wave plate. However, wavelength separation (color separation) using a dichroic mirror needs abrupt separation characteristics in the vicinity of a separated wavelength region, and the level of difficulty in manufacturing is extremely high.

In addition, as in a technology proposed by PTL 2 (Japanese Unexamined Patent Application Publication No. 2001-324762), a method is also known of achieving high wavelength separation efficiency by utilizing a pupil distribution. However, in this method, a single plate (a single light valve) is field-sequentially driven through filters of respective colors, which causes a decrease in light use efficiency as a whole even though wavelength separation efficiency is favorable.

In view of the circumstances as described above, the present disclosure proposes a novel technology of light separation using pupil conjugate and light combination as a light splitting method. Various methods of using the present technology are considered, and the present technology has the following advantages.

1. It is possible to eliminate orthogonal states of light beams outputted from respective light valves, and align polarization directions. Accordingly, providing a post-polarizer or a post-¼ wave plate makes it possible to improve contrast.

2. It is possible to significantly increase efficiency. In particular, wavelength separation efficiency is kept higher than a wavelength selective wave plate, which makes it possible to increase light use efficiency as a whole. Further, it is possible to selectively provide a post-polarizer action to light beams outputted from respective light valves in that state, and it is possible to increase contrast.

In the following respective embodiments, description is given of a configuration example in which an optical system according to the technology of the present disclosure is applied to a projector. However, the technology of the present disclosure is applicable not only to a projector but also to an exposure apparatus and the like.

1. First Embodiment

1.1 Configuration and Action of Optical System According to First Embodiment (Overview of Optical System)

FIG. 1 schematically illustrates an overall configuration example of an optical system according to a first embodiment of the present disclosure.

The first embodiment presents a configuration example in which two light valves are used. In the first embodiment, in order to suppress a deterioration in the light valves caused by a blue light beam, the blue light beam is split for the two light valves to reduce the amount of the blue light beam by half, thereby achieving an increase in longevity. In addition thereto, a purpose is to increase contrast.

Further, description is given, in the first embodiment, of a case where multiple color light beams include first to third color light beams. Each of the first to third color light beams is any of color light beams of R (red), G (green), and B (blue), for example. In the first embodiment, for example, blue light corresponds to a specific example of a "first color light beam" in the technology of the present disclosure; for example, green light corresponds to a specific example of a "second color light beam" in the technology of the present disclosure; and, for example, red light corresponds to a specific example of a "third color light beam" in the technology of the present disclosure.

As illustrated in FIG. 1, the optical system according to the first embodiment includes an illumination optical system 1 and a projection optical system 2. In addition, the optical system according to the first embodiment includes a first light valve 31 and a second light valve 32, and a PBS (polarization beam splitter) 41 on an optical path between the illumination optical system 1 and the projection optical system 2.

The illumination optical system 1 includes a blue light source 10, a phosphor wheel 11, a light-condensing lens 12, a QWP (¼ wave plate) 13, a wavelength selective PBS 14, a notch filter 15, a lens array 16, a PS converter 17, a first region-division wavelength selective wave plate 51, and a relay lens 18.

The projection optical system 2 includes multiple lenses 21, a second region-division wavelength selective wave plate 52, and a post-polarizer 22.

It is to be noted that, in FIG. 1, a direction that is orthogonal to the sheet is set as S-polarized light for the PBS 41, and a direction that is orthogonal to an optical axis and parallel to the sheet is set as P-polarized light for the PBS 41. In addition, a direction corresponding to the S-polarized light for the PBS 41 is referred to as a Z-direction, and a direction corresponding to the P-polarized light for the PBS 41 is referred to as a Y-direction, as appropriate. The same applies to the following other diagrams. In addition, the same also applies to the following other embodiments.

The illumination optical system 1 corresponds to a specific example of a "first optical system" in the technology of the present disclosure. The projection optical system 2 corresponds to a specific example of a "second optical system" in the technology of the present disclosure. The first region-division wavelength selective wave plate 51 corresponds to a specific example of a "first polarization rotation element" in the technology of the present disclosure. The second region-division wavelength selective wave plate 52 corresponds to a specific example of a "second polarization rotation element" in the technology of the present disclosure. The PS converter 17 corresponds to a specific example of a "polarization conversion element" in the technology of the present disclosure.

The illumination optical system 1 generates illumination light including multiple color light beams in mutually different wavelength bands. The illumination optical system 1 has a wavelength separation action to separate light in at least one wavelength band into multiple color light beams. The illumination optical system 1 generates color light beams of R, G, and B as the multiple color light beams, and outputs the color light beams toward the PBS 41.

The first region-division wavelength selective wave plate 51 is disposed at a pupil position P1 of the illumination optical system 1. The first region-division wavelength selective wave plate 51 includes multiple divided regions having mutually different polarization actions. The multiple divided regions in the first region-division wavelength selective wave plate 51 is, for example, a region A and a region B illustrated in FIG. 3 described later.

The first light valve 31 and the second light valve 32 are each illuminated, for example, at least by a blue light beam of the multiple color light beams. The PBS 41 causes each color light beam from the illumination optical system 1 to be incident on at least one of the first light valve 31 or the second light valve 32 in accordance with a polarization direction. The PBS 41 causes a blue light beam to be incident on the first light valve 31 and the second light valve 32 by splitting the blue light beam by a difference in polarization. In addition, the PBS 41 causes, for example, a green light beam to be incident on one light valve (the first light valve 31) of the first light valve 31 and the second light valve 32. In addition, the PBS 41 causes, for example, a red light beam to be incident on the other light valve (the second light valve 32) of the first light valve 31 and the second light valve 32. In addition, the PBS 41 outputs each of color light beams modulated by the first light valve 31 and the second light valve 32 toward the projection optical system 2 in accordance with a polarization direction.

The first light valve 31 and the second light valve 32 each modulate at least one color light beam of the multiple color light beams in accordance with an image signal, for example.

Each of the color light beams that have been modulated by the first light valve 31 and the second light valve 32 is incident on the projection optical system 2 via the PBS 41. The projection optical system 2 projects an image generated by the first light valve 31 and the second light valve 32 onto a projection plane such as an unillustrated screen.

The second region-division wavelength selective wave plate 52 is disposed at a pupil position P2 of the projection optical system 2. The second region-division wavelength selective wave plate 52 includes multiple divided regions having mutually different polarization actions. The multiple divided regions in the second region-division wavelength selective wave plate 52 are, for example, a region A' and a region B' illustrated in FIG. 4 described later.

The pupil position P1 of the illumination optical system 1 and the pupil position P2 of the projection optical system 2 are conjugate to each other. Each of the multiple divided regions in the first region-division wavelength selective wave plate 51 and each of the multiple divided regions in the second region-division wavelength selective wave plate 52 are conjugate to each other.

The pupil position P1 of the illumination optical system 1 corresponds to a specific example of a "first pupil position" in the technology of the present disclosure. The pupil position P2 of the projection optical system 2 corresponds to a specific example of a "second pupil position" in the technology of the present disclosure.

It is to be noted that the "first pupil position" in the technology of the present disclosure may be a position in the vicinity of the first pupil position. Accordingly, the "first polarization rotation element" (first region-division wavelength selective wave plate 51) in the technology of the present disclosure may be disposed at a position in the vicinity of the first pupil position (pupil position P1). However, the first polarization rotation element is preferably disposed on an optical path between the "polarization conversion element" (PS converter 17) and the relay lens 18 inside the "first optical system" (illumination optical system 1) in the technology of the present disclosure.

It is to be noted that the "second pupil position" in the technology of the present disclosure may be a position in the vicinity of the second pupil position. Accordingly, the "second polarization rotation element" (second region-division wavelength selective wave plate 52) in the technology of the present disclosure may be disposed at a position in the vicinity of the second pupil position (pupil position P2). However, the second polarization rotation element is preferably disposed on an optical path between two lenses before and after an aperture position inside the "second optical system" (projection optical system 2) in the technology of the present disclosure.

The post-polarizer 22 is disposed in an output optical path of the second region-division wavelength selective wave plate 52.

(Detailed Configuration and Action of Each Component)

Figure 2:
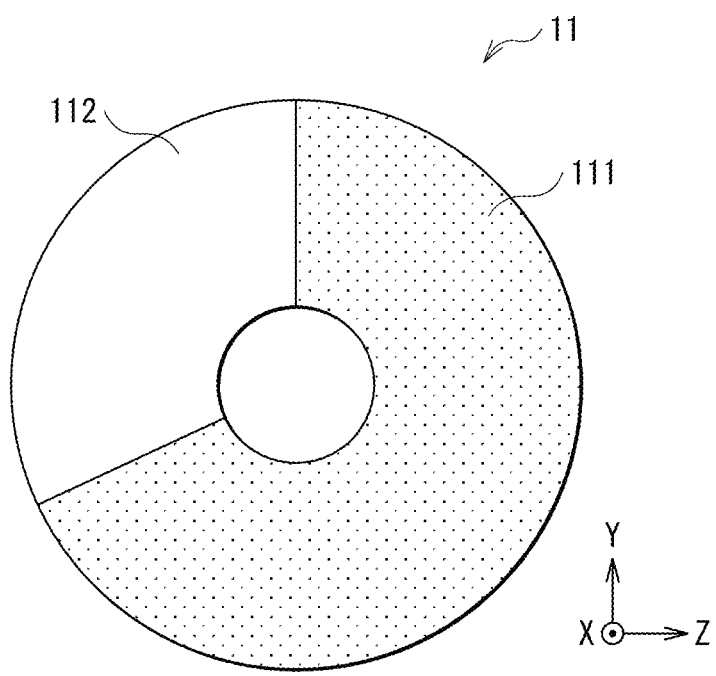
FIG. 2 is a configuration diagram schematically illustrating an example of a phosphor wheel in the optical system according to the first embodiment.
Figure 3:
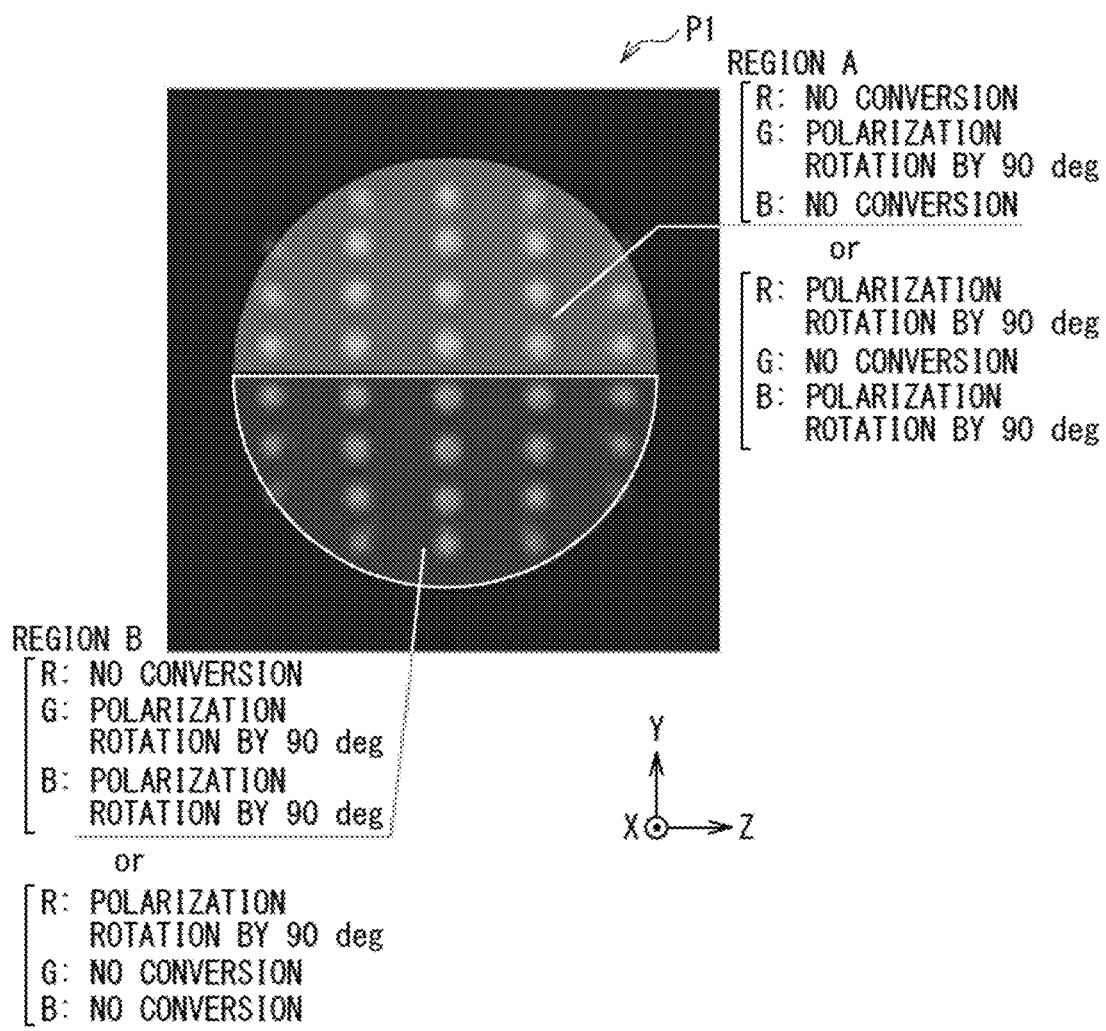
FIG. 3 is an explanatory diagram illustrating an example of a configuration and an action of a first region-division wavelength selective wave plate in the optical system according to the first embodiment.
Figure 4:
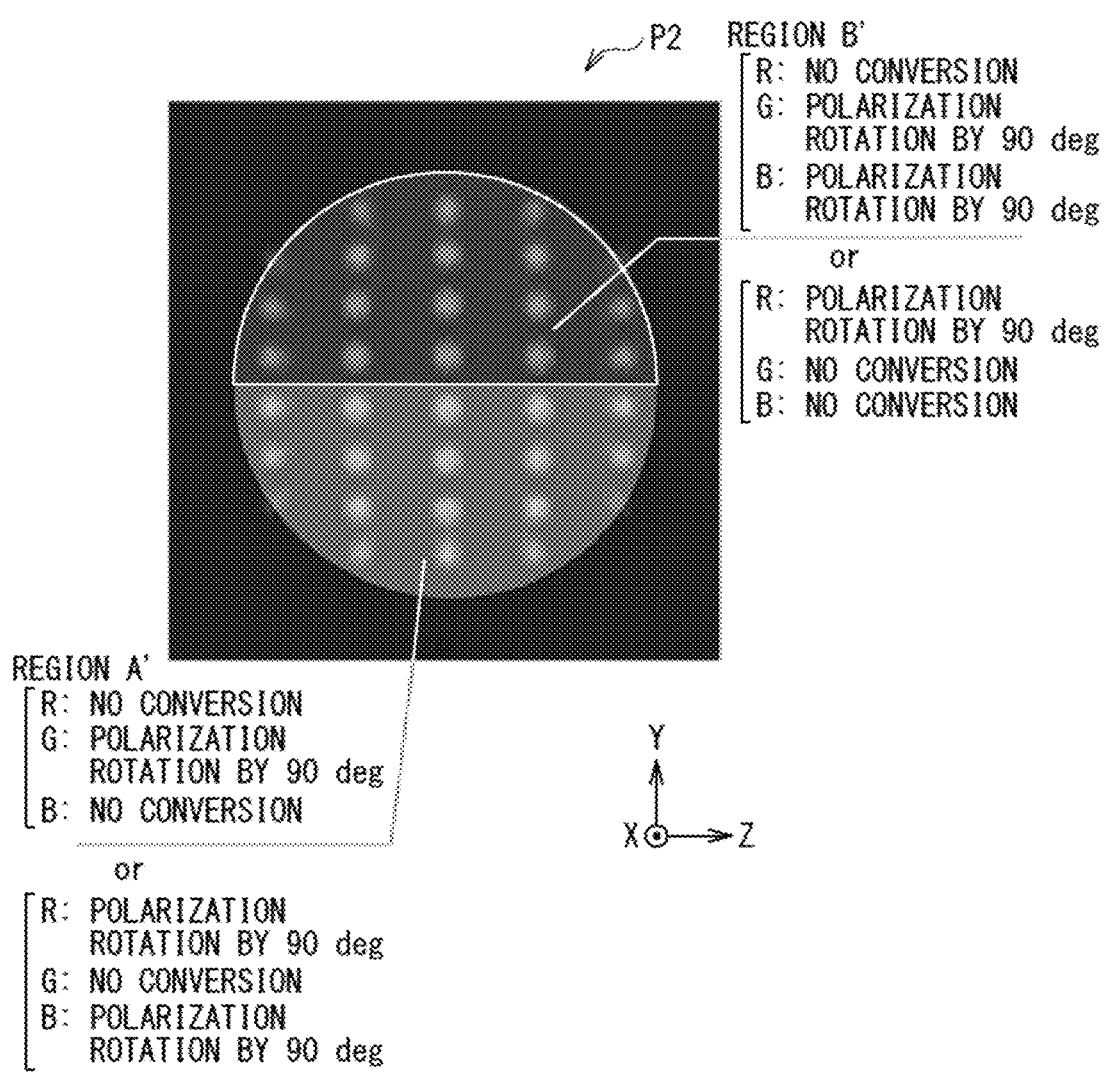
FIG. 4 is an explanatory diagram illustrating an example of a configuration and an action of a second region-division wavelength selective wave plate in the optical system according to the first embodiment.

FIG. 2 schematically illustrates a configuration example of the phosphor wheel 11. FIG. 3 illustrates an example of a configuration and an action of the first region-division wavelength selective wave plate 51. FIG. 4 illustrates an example of a configuration and an action of the second region-division wavelength selective wave plate 52.

The blue light source 10 is, for example, a blue laser. The phosphor wheel 11 includes a phosphor region 111 and a polarization maintaining diffuser region 112 as illustrated in FIG. 2. A yellow (Ye) light beam is obtained by irradiating the phosphor region 111 with a blue light beam as excitation light. The polarization maintaining diffuser region 112 does not have a polarization action, but has a reflection action with respect to the blue light beam. Therefore, a time-average white light beam obtained by temporally repeating yellow, blue, yellow, blue . . . is outputted from the phosphor wheel 11.

A blue light beam emitted from the blue light source 10 is reflected by the wavelength selective PBS 14 and then passes through the ¼ wave plate 13 to be converted into a circularly polarized light beam, and the circularly polarized light beam is incident on the phosphor wheel 11 via the light-condensing lens 12. An outputted light beam from the phosphor wheel 11 passes through the ¼ wave plate 13 again to be converted into a P-polarized light for the wavelength selective PBS 14. Thereafter, the P-polarized light is outputted by the wavelength selective PBS 14 to transmission side. In addition, a yellow light beam extracted from the phosphor wheel 11 is similarly reflected, and then is outputted by the wavelength selective PBS 14 to the transmission side. The yellow light beam generated by the phosphor wheel 11 is in a non-polarization state, and the wavelength selective PBS 14 has an action of transmitting the entire yellow light beam.

The blue light beam and the yellow light beam outputted from the wavelength selective PBS 14 pass through the notch filter 15 and the lens array 16, and then pass through the PS converter 17 to thereby align polarization states thereof with a predetermined direction (herein, for example, polarized light (P-polarized light) in the Y-direction). The first region-division wavelength selective wave plate 51 having characteristics illustrated in FIG. 3 is disposed in a portion where an immediately subsequent pupil (a first pupil) of the illumination optical system 1 is formed.

FIG. 3 illustrates an example of a configuration and an action of the first region-division wavelength selective wave plate 51. The first region-division wavelength selective wave plate 51 includes a first divided region and a second divided region, and the first divided region and the second divided region have mutually different polarization characteristics, for example, with respect to the blue light beam. For example, the region A in FIG. 3 corresponds to a specific example of a "first divided region" in the technology of the present disclosure, and the region B corresponds to a specific example of a "second divided region" in the technology of the present disclosure.

In the first region-division wavelength selective wave plate 51, for example, an upper half (region A) is a ½ wave plate that is inclined at 45 deg. and acts on only green, and a lower half (region B) is a ½ wave plate that is inclined at 45 deg. and acts on green and blue. It is to be noted that, in FIG. 3, a white small circular portion is an illumination distribution in this pupil. The same applies to diagrams related to other pupil portions. In the first region-division wavelength selective wave plate 51, when a wave plate action is exerted on illumination light, polarized light of a red light beam is not rotated in any of the regions to become polarized light (P-polarized light) in the Y-direction. In addition, polarized light of a green light beam is rotated by 90 deg. in any of the regions to become polarized light (S-polarized light) in the Z-direction. In addition, polarized light of a blue light beam is in a mixed state of non-rotated polarized light (polarized light (P-polarized light) in the Y-direction) and polarized light (polarized light (S-polarized light) in the Z-direction) rotated by 90 deg.

It is to be noted that the polarization characteristics of the first region-division wavelength selective wave plate 51 are not limited to the above-described characteristics, and may also have other configurations. For example, in the first region-division wavelength selective wave plate 51, the upper half (region A) may be a ½ wave plate that is inclined at 45 deg. and acts on red and blue, and the lower half (region B) may be a ½ wave plate that is inclined at 45 deg. and acts on only red. In this case, in the first region-division wavelength selective wave plate 51, the polarized light of a green light beam is not rotated in any of the regions. In addition, the polarized light of a red light beam is rotated by 90 deg. in any of the regions. In addition, the polarized light of a blue light beam is in a mixed state of non-rotated polarized light and a polarized light rotated by 90 deg.

When a light flux of each color reaches the PBS 41 via the relay lens 18 after having passed through the first region-division wavelength selective wave plate 51, each color light beam is selectively guided to the first light valve 31 and the second light valve 32 in accordance with each polarization state. The red light beam is P-polarized light, and reaches the second light valve 32. The green light beam is S-polarized light, and reaches the first light valve 31. The blue light beam is in the mixed state of P-polarized light and S-polarized light, and a half of the blue light beam reaches each of the first light valve 31 and the second light valve 32. In a case where a reflective liquid crystal is used for the first light valve 31 and the second light valve 32, performing white display on each light valve causes rotation of each polarized light, which changes each incident polarized light into output polarized light in an orthogonal state. Accordingly, in the first light valve 31, the red light beam and the blue light beam are outputted as S-polarized light beams, and in the second light valve 32, the blue light beam and the red light beam are outputted as P-polarized light beams. Accordingly, performing white display causes all light beams having passed through the PBS 41 to be outputted to side of the projection optical system 2.

Typically, the PBS 41 has a tendency that Rp (a reflected P-polarized component) is slightly larger than Ts (a transmitted S-polarized component) because of characteristics of a polarization film. Accordingly, there is a tendency that contrast is less likely to be made on side of the second light valve 32 than on side of the first light valve 31. One reason for this is that P-polarized light generated by the second light valve 32 is leaked more into the side of the projection optical system 2 than S-polarized light generated by the first light valve 31 during black display. In a case of a one-plate configuration using only one light valve, a configuration is made by using only the side of the first light valve 31 on which contrast is increased; however, a case of a two-plate configuration using two light valves is a factor for significantly impairing contrast. Accordingly, in order to achieve contrast of about 1000:1 in a case where the F-number of the illumination optical system 1 is about F/2.5 to 3 (and in a case where the notch filter 15 is included), it is necessary to align the polarization directions by the post-polarizer 22 (an analyzer subsequent to output of the PBS 41) and improve contrast.

In the optical system according to the first embodiment, in a case where the post-polarizer 22 is disposed immediately subsequent to the PBS 41 without contrivance, a light amount is reduced by half because the polarization states of the blue light beam are orthogonal. This is improved by using a conjugate action of the pupil, which is a greatest feature of the optical system according to the first embodiment.

That is, in the optical system according to the first embodiment, the second region-division wavelength selective wave plate 52 is disposed at the pupil (second pupil) position P2 of the projection optical system 2, subsequent to output from the PBS 41.

FIG. 4 illustrates an example of a configuration and an action of the second region-division wavelength selective wave plate 52. The second region-division wavelength selective wave plate 52 includes a third divided region and a fourth divided region, and the third divided region and the fourth divided region have mutually different polarization characteristics, for example, with respect to the blue light beam. For example, the region A' in FIG. 4 corresponds to a specific example of a "third divided region" in the technology of the present disclosure, and the region B' corresponds to a specific example of a "fourth divided region" in the technology of the present disclosure.

The pupil of the projection optical system 2 is conjugate to the pupil of the illumination optical system 1, and regional vertical inversion is provided for each conjugate portion because light valve reflection has been undergone. Accordingly, as illustrated in FIG. 4, a region conjugate to the region A of the first region-division wavelength selective wave plate 51 is the region A' in a lower portion of the second region-division wavelength selective wave plate 52, and a region conjugate to the region B of the first region-division wavelength selective wave plate 51 is the region B' in an upper portion of the second region-division wavelength selective wave plate 52. Conjugate means that light having passed through the region A of the first region-division wavelength selective wave plate 51 passes through the region A' of the second region-division wavelength selective wave plate 52 without fail, and light having passed through the region B of the first region-division wavelength selective wave plate 51 passes through the region B' of the second region-division wavelength selective wave plate 52 without fail. Accordingly, P-polarized light and S-polarized light of the blue light beam in the mixed state are selectively incident on the region B' and the region A', respectively. Thereafter, the polarized light of the blue light beam is not converted in the region A', and polarized light of the blue light beam is rotated by 90 deg. in the region B'. In addition, in any of the regions, the polarized light of the red light beam is not rotated, and the polarized light of the green light beam is rotated by 90 deg., which consequently aligns polarized light beams of the respective color light beams after having passed through the second region-division wavelength selective wave plate 52 to the S-polarized light.

It is to be noted that the polarization characteristics of the second region-division wavelength selective wave plate 52 are not limited to the above-described characteristics, and may also have other configurations. For example, in the second region-division wavelength selective wave plate 52, the region A' may be a ½ wave plate that is inclined at 45 deg. and acts on red and blue, and the region B' may be a ½ wave plate inclined at 45 deg. and acts on only red. In this case, in the second region-division wavelength selective wave plate 52, the polarized light of the green light beam is not rotated in any of the regions. In addition, the polarized light of the red light beam is rotated by 90 deg. in any of the regions. In addition, the polarized light of the blue light beam is rotated by 90 deg. in the region A', but is not rotated in the region B'.

The post-polarizer 22 is disposed to cut P-polarized light after having passed through the second region-division wavelength selective wave plate 52, which makes it possible to improve contrast. In an experiment system imitating the optical system according to the first embodiment, about 1000:1 at F/2.5 as white contrast was obtained as an experiment result, and the light amount of a blue light beam was able to be split by about half for the first light valve 31 and the second light valve 32. Thus, it was confirmed that an assumed action was exhibited.

In the optical system according to the first embodiment, at the time of emission of a yellow light beam in the phosphor wheel 11, a green light beam is selectively guided to the side of the first light valve 31, and a red light beam is selectively guided to the side of the second light valve 32. In addition, at a timing of outputting a blue light beam from the phosphor wheel 11, a half of the blue light beam is guided to each of the first light valve 31 and the second light valve 32. In each light valve, output of gradation for each color light beam is performed during a time corresponding to each color light beam. That is, in order to enhance contrast while splitting a blue light beam into two, pupil conjugate is used. As described above, the main purpose is to significantly expand the life of the entire optical system by splitting a blue light beam, which is a cause of shortening the life of the light valve, into two to reduce an amount of incident light by half. Light to be split into two in this sense is desirably at 500 nm or less.

It is to be noted that a comparative example with respect to the configuration of the optical system according to the first embodiment is a projector described in PTL 3 (Japanese Unexamined Patent Application Publication No. 2008-165058). In the projector described in PTL 3, a region-divided retardation plate is disposed in the vicinity of a pupil in a projection optical system, and splits light into two by polarization in the projection optical system. However, there is a difference in quality between simply splitting light by polarization in the projection optical system and exerting a region-division polarization action on a portion conjugate to a region divided in the pupil of the illumination optical system 1 as with the optical system according to the first embodiment. That is, in the former, an equal polarization action is exerted as well on light generated by any light valve. In contrast, the latter has characteristics that use of a conjugate relationship makes it possible to exert a specific polarization action only on light having reached a specific light valve.

Figure 5:
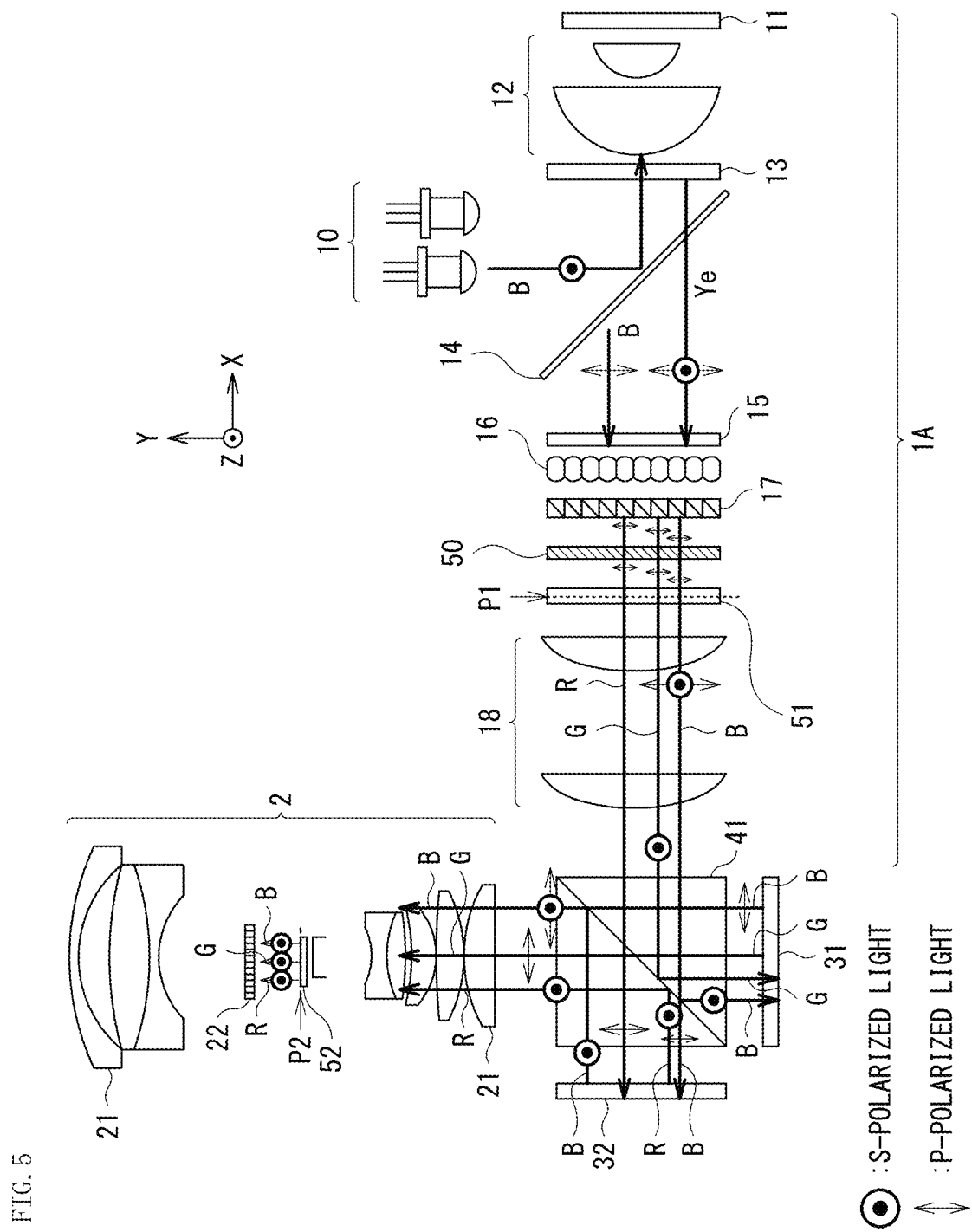
FIG. 5 is a configuration diagram schematically illustrating an overall configuration of a desired configuration example of the optical system according to the first embodiment.

1.2 Desirable Configuration Example of Optical System According to First Embodiment FIG. 5 schematically illustrates an overall configuration of a desirable configuration example of an optical systems according to the first embodiment.

The optical system illustrated in FIG. 5 includes an illumination optical system 1A in place of the illumination optical system 1 in the optical system illustrated in FIG. 1. The illumination optical system 1A further includes a pre-polarizer 50 in addition to the configuration of the illumination optical system 1.

In the illumination optical system 1A, the pre-polarizer 50 is disposed between the PS converter 17 and the first region-division wavelength selective wave plate 51. The pre-polarizer 50 is a polarizer that reduces light in a polarization direction other than a predetermined polarization direction (P-polarized light in the example of FIG. 5) included in light outputted from the PS converter 17. It is preferable to use, as the pre-polarizer 50, a wire grid of a reflective metal structure, for example, for the purpose of providing a favorable rectifying action and increasing an extinction ratio. Disposing the pre-polarizer 50 between the PS converter 17 and the first region-division wavelength selective wave plate 51 makes it possible to reduce the light in the polarization direction, other than the predetermined polarization direction, which have failed to be aligned by the PS converter 17. This makes it possible to further achieve an improvement in contrast.

1.3 Effects

As described above, according to the optical system of the first embodiment, the first region-division wavelength selective wave plate 51 including multiple divided regions having mutually different polarization actions is disposed at the pupil position P1 of the illumination optical system 1, and the second region-division wavelength selective wave plate 52 including multiple divided regions having mutually different polarization actions is disposed at the pupil position P2 of the projection optical system 2 conjugate to the first pupil position, which makes it possible to achieve an improvement in contrast.

According to the optical system of the first embodiment, in addition to expectation of an increase in contrast, it is possible to prevent color unevenness on a projection plane by aligning polarized light beams of final outputted light in the projection optical system 2 in one direction. In addition, contrast is enhanced in a state where two light valves are used with respect to one PBS 41, which consequently makes it possible to downsize the entire optical system.

Further, according to the optical system of the first embodiment, in the illumination optical system 1A (FIG. 5), disposing the pre-polarizer 50 that reduces light in a polarization direction other than a predetermined polarization direction included in light outputted from the PS converter 17 makes it possible to further achieve an improvement in contrast.

It is to be noted that the effects described herein are merely exemplary and not limiting, and there may be other effects as well. The same applies to effects of the following other embodiments.

2. Second Embodiment

Next, description is given of an optical system according to a second embodiment of the present disclosure. It is to be noted that, in the following description, components substantially the same as those of the optical system according to the first embodiment described above are denoted by the same reference numerals, and descriptions thereof are omitted as appropriate.

As described above, in the optical system according to the first embodiment, disposing the pre-polarizer 50 between the PS converter 17 and the first region-division wavelength selective wave plate 51 as in the configuration example illustrated in FIG. 5 makes it possible to achieve an improvement in contrast. Meanwhile, in a case where the pre-polarizer 50 is disposed, there is a possibility that return light from the first light valve 31 or the second light valve 32 may become unnecessary light reflected by the pre-polarizer 50 and returning again as illumination light to the first light valve 31 or the second light valve 32. Description is given, in the optical system according to the second embodiment, of a configuration to reduce generation of the unnecessary light. Description is given first of the principle of the generation of the unnecessary light, before describing the configuration of the optical system according to the second embodiment.

(Principle of Generation of Unnecessary Light)

Figure 6:
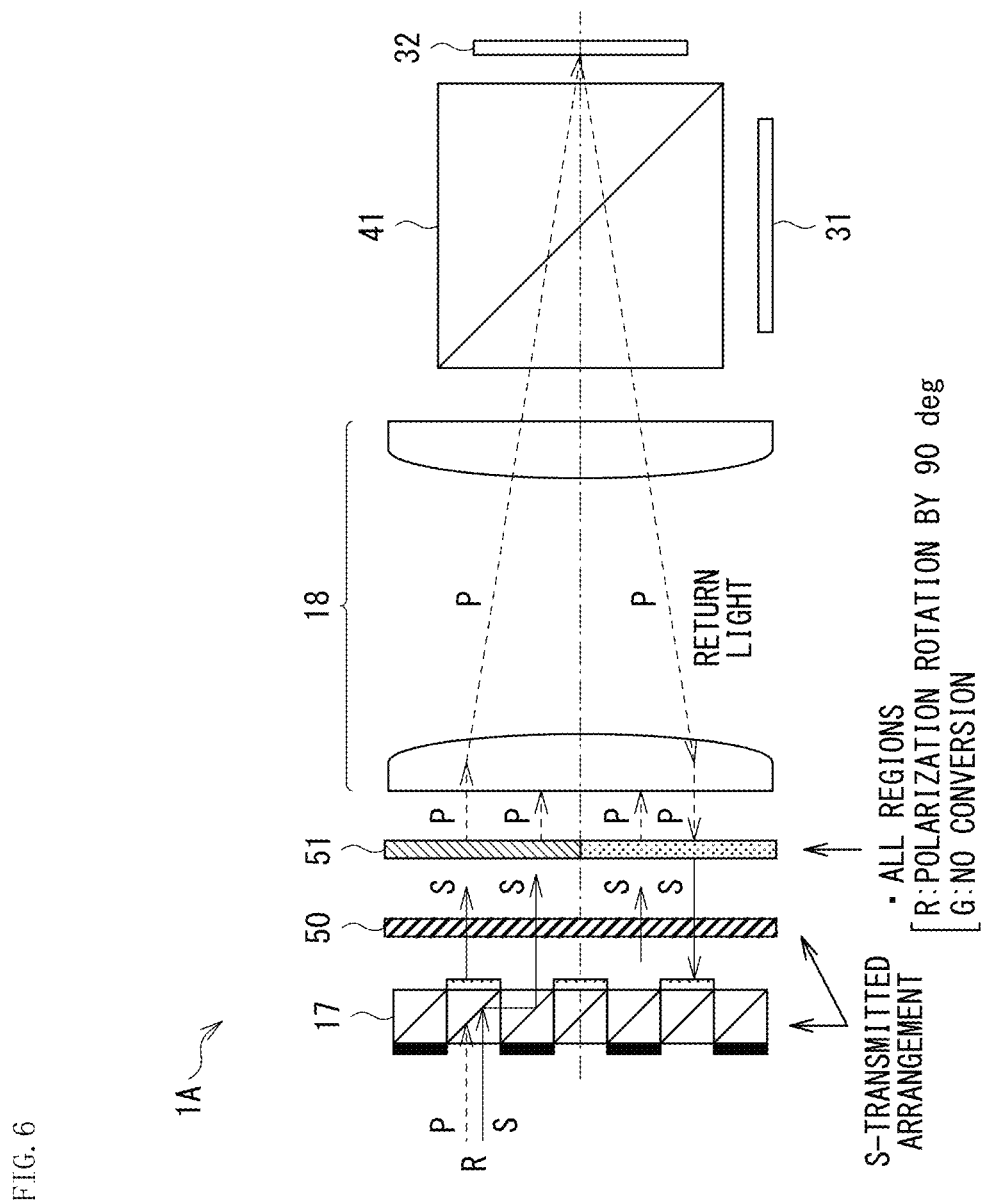
FIG. 6 is an explanatory diagram illustrating a first example of an optical path of return light generated in the configuration example illustrated in FIG. 5.
Figure 7:
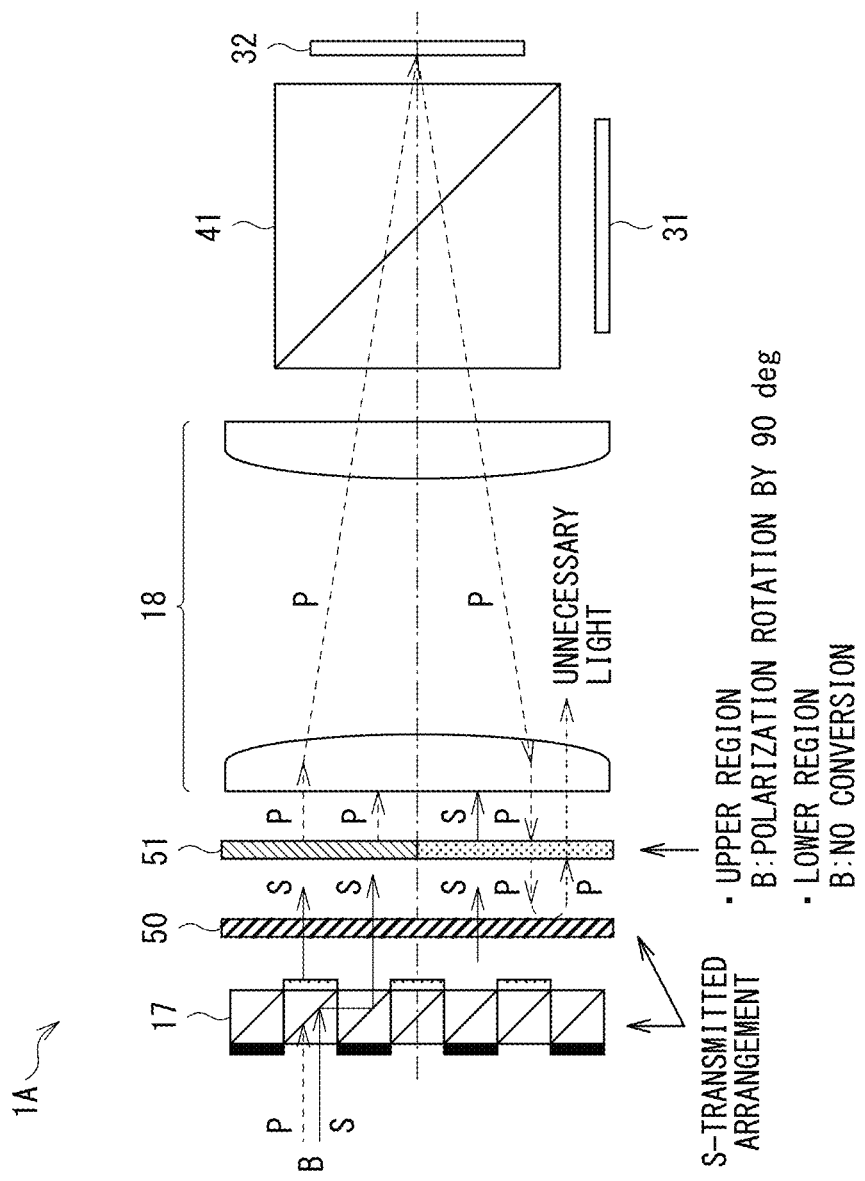
FIG. 7 is an explanatory diagram illustrating a second example of the optical path of the return light generated in the configuration example illustrated in FIG. 5.
Figure 8:
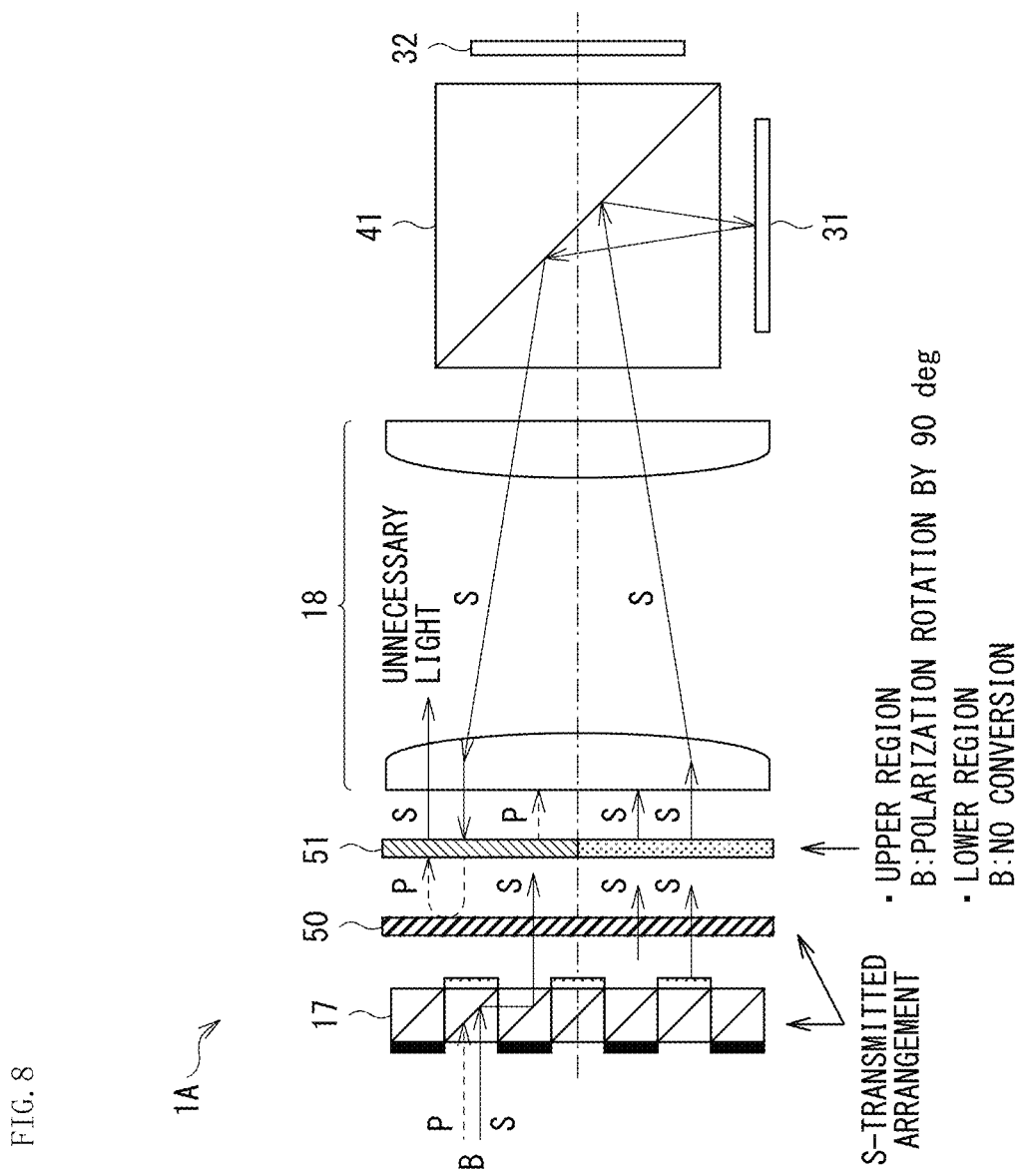
FIG. 8 is an explanatory diagram illustrating a third example of the optical path of the return light generated in the configuration example illustrated in FIG. 5.

FIGS. 6 to 8 illustrate first to third examples of an optical path of generated return light in the configuration example illustrated in FIG. 5.

It is to be noted that FIGS. 6 to 8 each only illustrate a configuration of a main part required for description. In addition, FIGS. 6 to 8 exemplify a case where the PS converter 17 aligns incident light with S-polarized light as a predetermined polarization direction, with respect to the configuration example illustrated in FIG. 5. Respective color light beams of red light, green light, and blue light are incident as S-polarized light beams on the first region-division wavelength selective wave plate 51. In FIGS. 6 to 8, the pre-polarizer 50 is configured to transmit only S-polarized light and to reflect light in a polarization direction other than the S-polarized light. In FIGS. 6 to 8, the first region-division wavelength selective wave plate 51 is configured to rotate polarized light of the red light beam by 90 deg. in all regions and not to rotate polarized light of the green light beam in all regions. In addition, in FIGS. 6 to 8, the first region-division wavelength selective wave plate 51 is configured to rotate polarized light of the blue light beam by 90 deg. in an upper region (region A in FIG. 3) and not to perform rotation in a lower region (region B in FIG. 3).

First, description is given of return light of each of the red light beam and the green light beam with reference to FIG. 6. The first region-division wavelength selective wave plate 51 rotates polarized light in all regions for the red light beam, and thus a P-polarized red light beam is outputted from the first region-division wavelength selective wave plate 51 across all regions. The P-polarized red light beam passes through the relay lens 18 while remaining as the P-polarized light to reach the second light valve 32 via the PBS 41. The second light valve 32 does not rotate polarized light during black display; thus, the red light beam is reflected while remaining as the P-polarized light by the second light valve 32, and becomes P-polarized return light returning again to the first region-division wavelength selective wave plate 51. The first region-division wavelength selective wave plate 51 rotates polarized light for the red light beam in all regions, and thus the P-polarized return light becomes S-polarized return light to reach the pre-polarizer 50. The pre-polarizer 50 is configured to transmit the S-polarized light, and thus the S-polarized return light passes through the pre-polarizer 50 as it is. Therefore, no unnecessary light is generated for the red light beam.

As for the green light beam, the first region-division wavelength selective wave plate 51 does not rotate polarized light in all regions for the green light beam, and thus an S-polarized green light beam is outputted from the first region-division wavelength selective wave plate 51 across all regions. The S-polarized green light beam propagates through the relay lens 18 while remaining as the S-polarized light to reach the first light valve 31. The first light valve 31 does not rotate polarized light during black display; thus, the green light beam is reflected by the first light valve 31 while remaining as the S-polarized light, and becomes the S-polarized return light returning again to the first region-division wavelength selective wave plate 51. The first region-division wavelength selective wave plate 51 does not rotate polarized light for the green light beam in all regions, and thus the S-polarized return light reaches the pre-polarizer 50 as it is. The pre-polarizer 50 is configured to transmit the S-polarized light, and thus the S-polarized return light passes through the pre-polarizer 50 as it is. Therefore, no unnecessary light is generated for the green light beam. That is, in the configuration of FIG. 6, no unnecessary light is generated for the return light of the red light beam and the green light beam.

Next, description is given of return light of the blue light beam with reference to FIGS. 7 and 8.

First, description is given, with reference to FIG. 7, of return light of the blue light beam returning to the lower region after having passed through the upper region of the first region-division wavelength selective wave plate 51. The first region-division wavelength selective wave plate 51 rotates polarized light for the blue light beam in the upper region, and thus a P-polarized blue light beam is outputted from the upper region of the first region-division wavelength selective wave plate 51. The P-polarized blue light beam passes through the relay lens 18 while remaining as the P-polarized light to reach the second light valve 32 via the PBS 41. The second light valve 32 does not rotate polarized light during black display; thus, the blue light beam is reflected by the second light valve 32 while remaining as the P-polarized light, and becomes P-polarized return light returning to the lower region of the first region-division wavelength selective wave plate 51. The first region-division wavelength selective wave plate 51 does not rotate polarized light for the blue light beam in the lower region, and thus the P-polarized return light reaches the pre-polarizer 50 while remaining as the P-polarized light. The pre-polarizer 50 is configured to transmit the S-polarized light and to reflect the P-polarized light, and thus the P-polarized return light becomes unnecessary light having sufficient light amount reflected by the pre-polarizer 50 and returning again to the second light valve 32.

Next, description is given, with reference to FIG. 8, of return light of the blue light beam returning to the upper region after having passed through the lower region of the first region-division wavelength selective wave plate 51. The first region-division wavelength selective wave plate 51 does not rotate polarized light for the blue light beam in the lower region, and thus a S-polarized blue light beam is outputted from the lower region of the first region-division wavelength selective wave plate 51. The S-polarized blue light beam propagates through the relay lens 18 while remaining as the S-polarized light to reach the first light valve 31. The first light valve 31 does not rotate polarized light during black display; thus, the blue light beam is reflected by the first light valve 31 while remaining as the S-polarized light, and becomes S-polarized return light returning to the upper region of the first region-division wavelength selective wave plate 51. The first region-division wavelength selective wave plate 51 rotates polarized light for the blue light beam in the upper region, and thus causes it to become the P-polarized return light and to reach the pre-polarizer 50. The pre-polarizer 50 is configured to transmit the S-polarized light and to reflect the P-polarized light, and thus the P-polarized return light becomes unnecessary light having sufficient light amount reflected by the pre-polarizer 50 and returning again to the first light valve 31.

Figure 9:
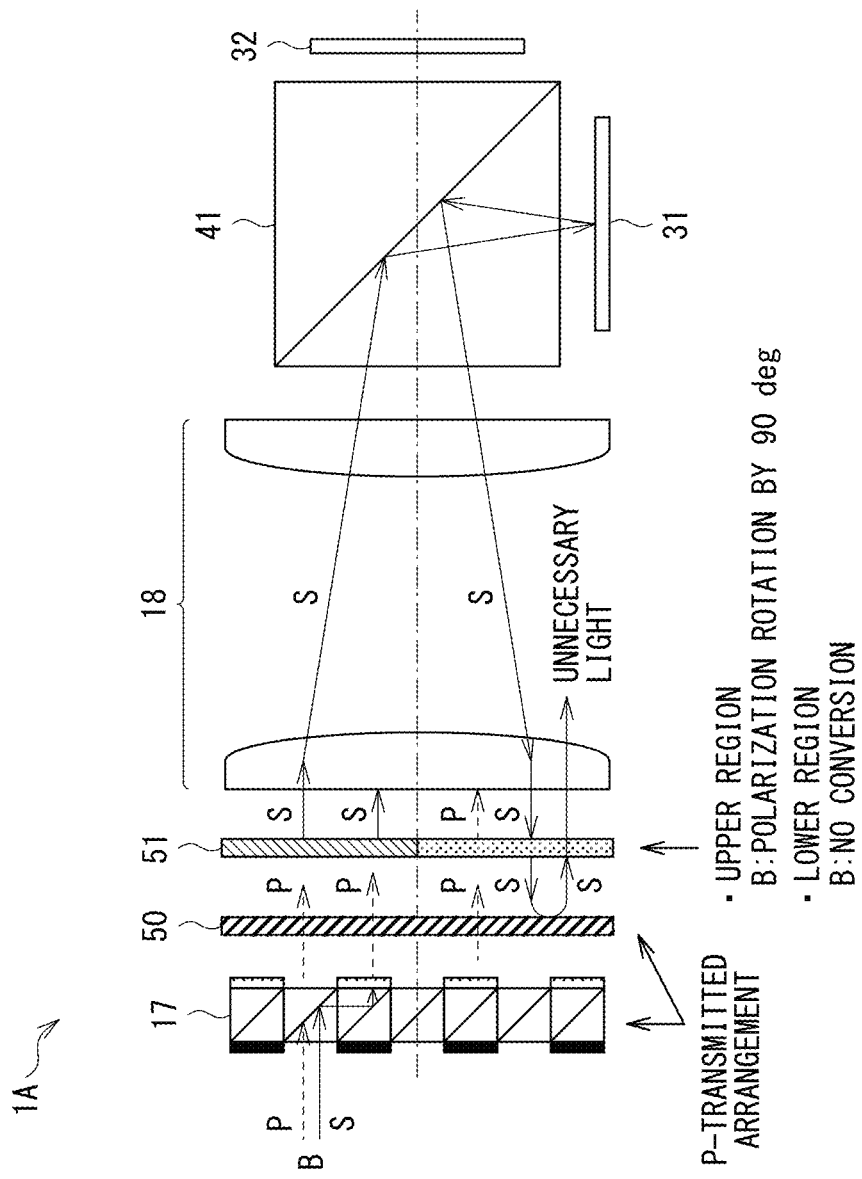
FIG. 9 is an explanatory diagram illustrating a fourth example of the optical path of the return light generated in the configuration example illustrated in FIG. 5.

FIG. 9 illustrates a fourth example of the optical path of return light generated in the configuration example illustrated in FIG. 5.

It is to be noted that FIG. 9 only illustrates a configuration of a main part required for description. In addition, FIG. 9 exemplifies a case where the PS converter 17 aligns incident light with P-polarized light as a predetermined polarization direction, similarly to the configuration example illustrated in FIG. 5. Respective color light beams of red light, green light, and blue light are incident as P-polarized light on the first region-division wavelength selective wave plate 51. In FIG. 9, the pre-polarizer 50 is configured to transmit only P-polarized light and to reflect light in a polarization direction other than the P-polarized light. In FIG. 9, the first region-division wavelength selective wave plate 51 is configured to rotate polarized light of the blue light beam by 90 deg. in the upper region (region A in FIG. 3) and not to perform rotation in the lower region (region B in FIG. 3).

FIG. 9 illustrates an optical path of return light of the blue light beam returning to the lower region after having passed through the upper region of the first region-division wavelength selective wave plate 51. The first region-division wavelength selective wave plate 51 rotates polarized light for the blue light beam in the upper region, and thus a S-polarized blue light beam is outputted from the upper region of the first region-division wavelength selective wave plate 51. The S-polarized blue light beam passes through the relay lens 18 while remaining as the S-polarized light to reach the first light valve 31 via the SBS 41. The first light valve 31 does not rotate polarized light during black display; thus, the blue light beam is reflected by the first light valve 31 while remaining as the S-polarized light, and becomes S-polarized return light returning again to the lower region of the first region-division wavelength selective wave plate 51. The first region-division wavelength selective wave plate 51 does not rotate polarized light for the blue light beam in the lower region, and thus the S-polarized return light reaches the pre-polarizer 50 while remaining as the S-polarized light. The pre-polarizer 50 is configured to transmit the P-polarized light and to reflect the S-polarized light, and thus the S-polarized return light becomes unnecessary light having sufficient light amount reflected by the pre-polarizer 50 and returning again to the first light valve 31.

As described above, in a case where the pre-polarizer 50 is configured to be disposed between the PS converter 17 and the first region-division wavelength selective wave plate 51 in the optical system according to the first embodiment, unnecessary light of the blue light beam is generated regardless of whether the direction of the polarized light outputted from the PS converter 17 is the S-polarized light or the P-polarized light. This causes deterioration of the black level in contrast in particular, thus affecting a projection image.

(Configuration and Action of Optical System According to Second Embodiment)

Figure 10:
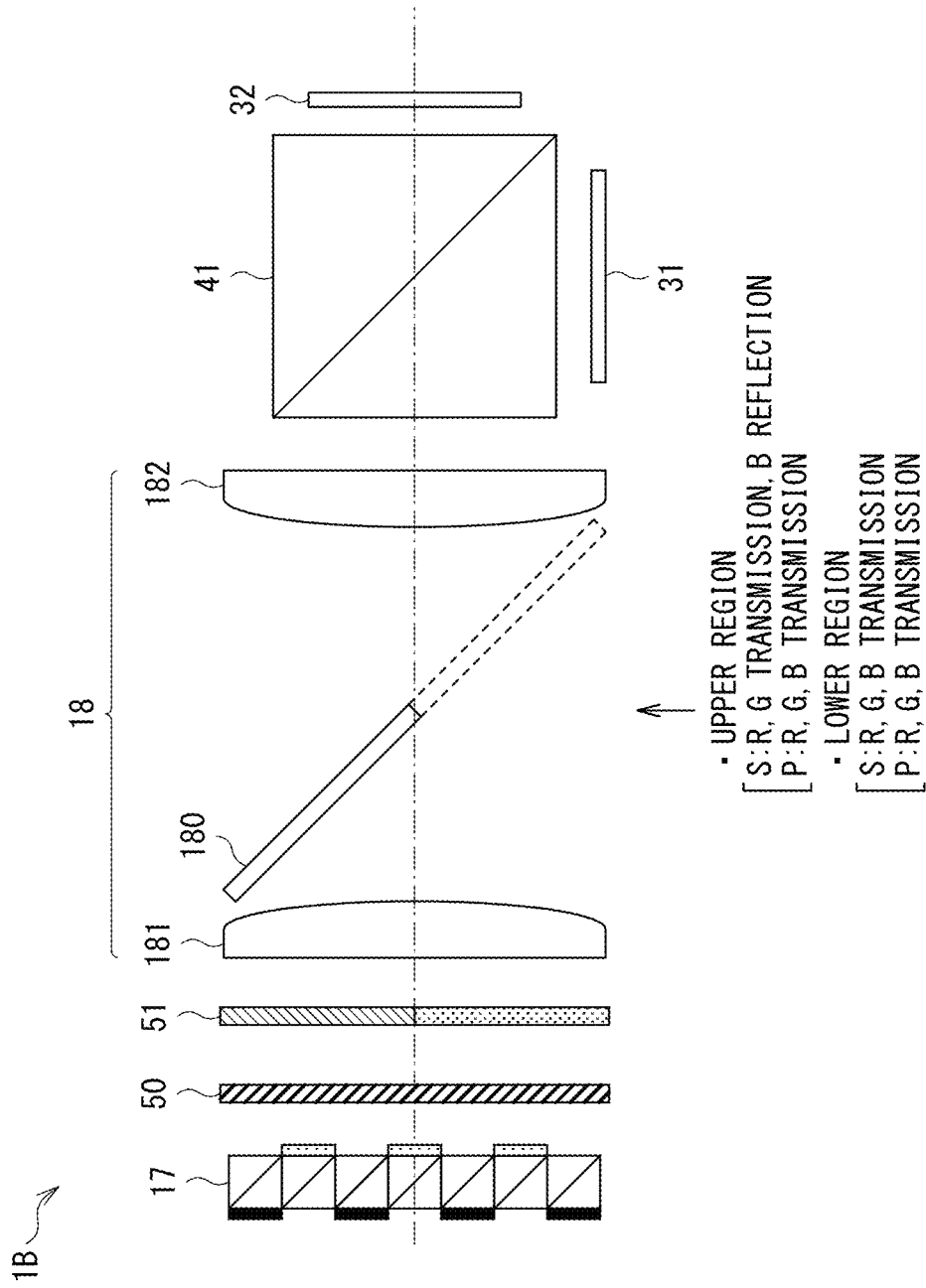
FIG. 10 is a configuration diagram schematically illustrating a configuration example of a main part of an optical system according to a second embodiment.

FIG. 10 schematically illustrates a configuration example of a main part of an optical system according to a second embodiment.

It is to be noted that FIG. 10 only illustrates a configuration of a main part required for description. In addition, FIG. 10 exemplifies a case where the PS converter 17 aligns incident light with S-polarized light, for example, as a predetermined polarization direction, with respect to the configuration example illustrated in FIG. 5. Respective color light beams of red light, green light, and blue light are incident, for example, as S-polarized light on the first region-division wavelength selective wave plate 51. In FIG. 10, the pre-polarizer 50 is configured to transmit only S-polarized light, for example, and to reflect light in a polarization direction other than the S-polarized light, for example. In FIG. 10, for example, the first region-division wavelength selective wave plate 51 is configured to rotate polarized light of the red light beam by 90 deg. in all regions and not to rotate polarized light of the green light beam in all regions. In addition, in FIG. 10, for example, the first region-division wavelength selective wave plate 51 is configured to rotate polarized light of the blue light beam by 90 deg. in the upper region (region A in FIG. 3) and not to perform rotation in the lower region (region B in FIG. 3).

The optical system according to the second embodiment includes an illumination optical system 1B in place of the illumination optical system 1A illustrated in FIG. 5. The illumination optical system 1B further includes a region-division wavelength selective mirror 180 in addition to the configuration of the illumination optical system 1A. The region-division wavelength selective mirror 180 corresponds to a specific example of a "wavelength selective reflective element" in the technology of the present disclosure.

The region-division wavelength selective mirror 180 is disposed on an optical path between the first region-division wavelength selective wave plate 51 and each of the first light valve 31 and the second light valve 32. In the configuration example of FIG. 11, the relay lens 18 includes a first lens 181 and a second lens 182. The region-division wavelength selective mirror 180 is disposed on an optical path between the first lens 181 and the second lens 182 in the relay lens 18.

The region-division wavelength selective mirror 180 is a wavelength selective reflective element that reduces return light of the blue light beam returning to the pre-polarizer 50 from at least one light valve of the first light valve 31 or the second light valve 32. The region-division wavelength selective mirror 180 is disposed to be inclined relative to an optical axis of the optical path between the first region-division wavelength selective wave plate 51 and each of the first light valve 31 and the second light valve 32.

Figure 11:
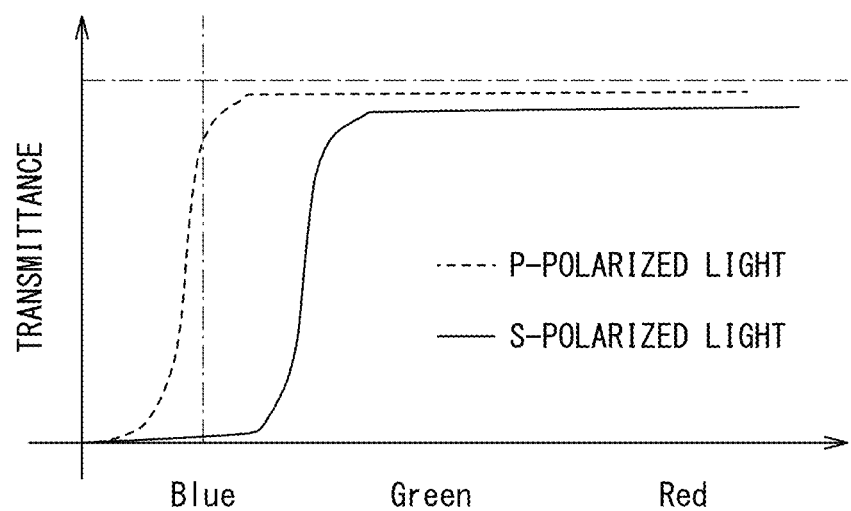
FIG. 11 is a characteristic diagram illustrating an example of transmission characteristics of a region-division wavelength selective mirror in the optical system according to the second embodiment.

FIG. 11 illustrates an example of transmission characteristics of the region-division wavelength selective mirror in the optical system according to the second embodiment. The region-division wavelength selective mirror 180 is a polarizing dichroic plate having wavelength dependency in a region corresponding to at least one divided region of the upper region (region A in FIG. 3) or the lower region (region B in FIG. 3) in the first region-division wavelength selective wave plate 51. Therefore, the region-division wavelength selective mirror 180 may be disposed in the region corresponding to at least one divided region of the upper region or the lower region in the first region-division wavelength selective wave plate 51.

In the configuration example of FIG. 10, the region-division wavelength selective mirror 180 has characteristics with wavelength dependency as illustrated in FIG. 11 only for a region corresponding to the upper region in the first region-division wavelength selective wave plate 51. That is, in the region corresponding to the upper region in the first region-division wavelength selective wave plate 51, for example, the region-division wavelength selective mirror 180 has characteristics, for S-polarized light, to transmit the red light beam and the green light beam and to reflect the blue light beam. In addition, in the region corresponding to the upper region in the first region-division wavelength selective wave plate 51, for example, the region-division wavelength selective mirror 180 has characteristics, for P-polarized light, to transmit the red light beam, the green light beam, and the blue light beam. In addition, in the region corresponding to the lower region in the first region-division wavelength selective wave plate 51, for example, the region-division wavelength selective mirror 180 has characteristics to transmit the red light beam, the green light beam, and the blue light beam, regardless of the polarization direction. In this manner, in the region corresponding to the lower region in the first region-division wavelength selective wave plate 51, it is sufficient to transmit each color light beam regardless of the polarization direction, and thus the region-division wavelength selective mirror 180 having wavelength dependency across all the regions may be configured to be disposed only in the region corresponding to the upper region of the first region-division wavelength selective wave plate 51.

Figure 12:
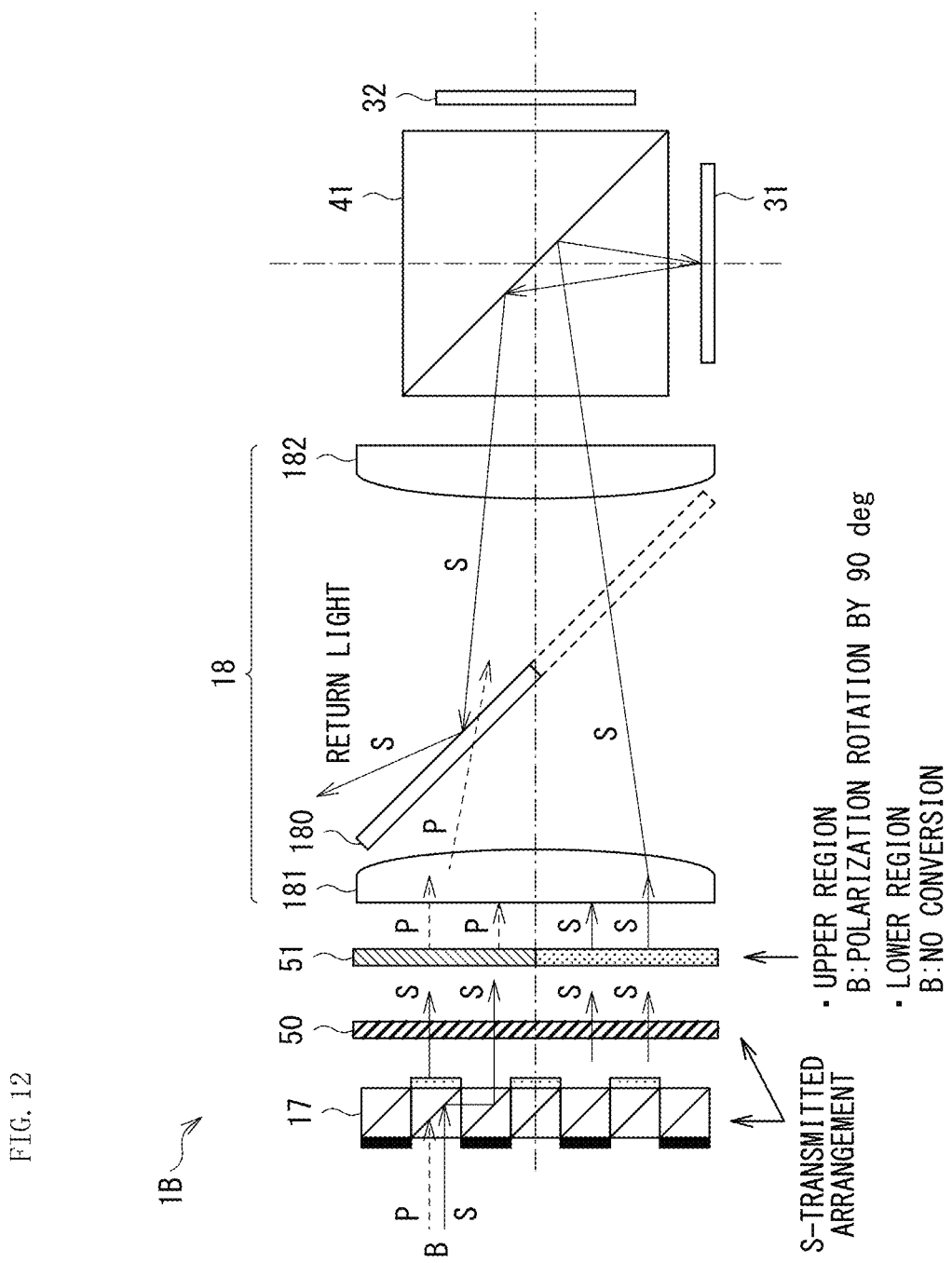
FIG. 12 is an explanatory diagram illustrating an example of an optical path of return light generated in the optical system according to the second embodiment.

FIG. 12 illustrates an example of an optical path of return light generated in the optical system according to the second embodiment.

In a region corresponding to one divided region of the upper region and the lower region in the first region-division wavelength selective wave plate 51, the region-division wavelength selective mirror 180 transmits all multiple color light beams from the one divided region. In addition, in the region corresponding to the one divided region of the upper region and the lower region in the first region-division wavelength selective wave plate 51, the region-division wavelength selective mirror 180 reflects return light of the blue light beam returning to the first region-division wavelength selective wave plate 51 from at least one light valve of the first light valve 31 or the second light valve 32. In addition, in a region corresponding to another divided region of the upper region and the lower region in the first region-division wavelength selective wave plate 51, the region-division wavelength selective mirror 180 transmits all multiple color light beams from the other divided region.

FIG. 12 illustrates a state of removal of unnecessary light caused by the return light of the blue light beam returning to the upper region after having passed through the lower region of the first region-division wavelength selective wave plate 51 described above with reference to FIG. 8. In the optical system according to the second embodiment, for example, as illustrated in FIG. 12, S-polarized blue light beam is outputted from the lower region of the first region-division wavelength selective wave plate 51. In the region corresponding to the lower region of the first region-division wavelength selective wave plate 51, the region-division wavelength selective mirror 180 transmits the S-polarized blue light beam as it is, and thus the S-polarized blue light beam propagates through the relay lens 18 while remaining as the S-polarized light to reach the first light valve 31. The first light valve 31 does not rotate polarized light during black display; thus, the blue light beam is reflected by the first light valve 31 while remaining as the S-polarized light, and becomes S-polarized return light returning to the upper region of the first region-division wavelength selective wave plate 51. Here, the region-division wavelength selective mirror 180 having characteristics to reflect the S-polarized blue light beam is disposed in the region corresponding to the upper region of the first region-division wavelength selective wave plate 51, and thus the return light of the blue light beam does not reach the upper region of the first region-division wavelength selective wave plate 51, but is reflected to the outside of the optical path. This removes unnecessary light caused by the return light of the S-polarized blue light beam returning to the upper region. It is to be noted that, in the region corresponding to the upper region of the first region-division wavelength selective wave plate 51 in the region-division wavelength selective mirror 180, the blue light beam is transmitted for P-polarized light to reach the second light valve 32. In addition, the region-division wavelength selective mirror 180 has characteristics to transmit the red light beam and the green light beam regardless of polarization, and thus the red light beam and the green light beam reach the first light valve 31 or the second light valve 32 unproblematically. This makes it possible to selectively remove only the S-polarized blue light beam to be unnecessary light.

Other configurations, actions, and effects may be substantially similar to those in the optical system according to the first embodiment described above.

3. Third Embodiment

Next, description is given of an optical system according to a third embodiment of the present disclosure. It is to be noted that, in the following, components substantially the same as those of the optical system according to the first or second embodiment described above are denoted by the same reference numerals, and descriptions thereof are omitted as appropriate.

Description is given, in the optical system according to the third embodiment, of a configuration to reduce generation of the unnecessary light caused by disposing of the pre-polarizer 50, similarly to the optical system according to the second embodiment.

Figure 13:
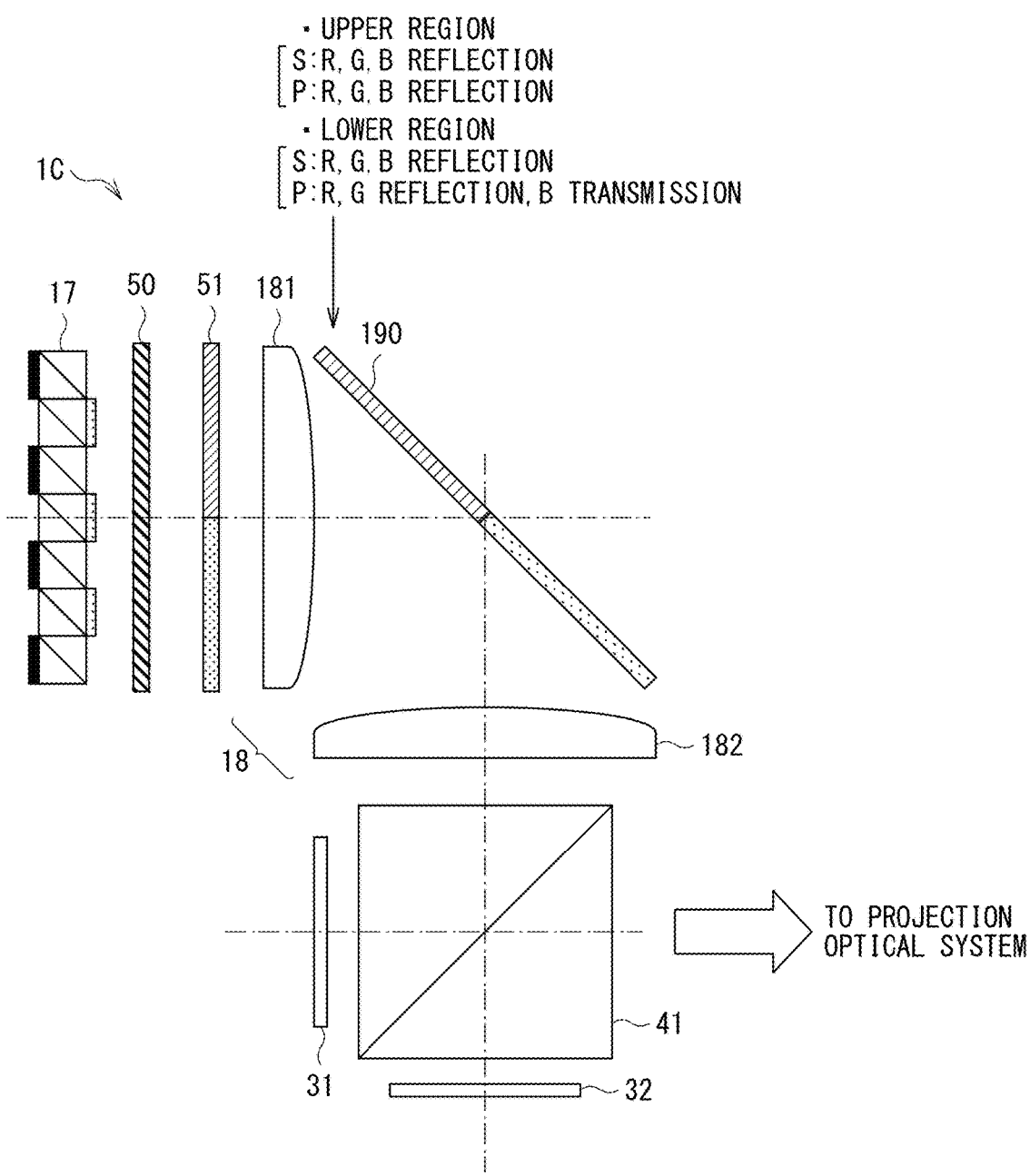
FIG. 13 is a configuration diagram schematically illustrating a configuration example of a main part of an optical system according to a third embodiment.

FIG. 13 schematically illustrates a configuration example of a main part of the optical system according to the third embodiment.

It is to be noted that FIG. 13 only illustrates a configuration of a main part required for description. In addition, FIG. 13 exemplifies a case where the PS converter 17 aligns incident light with S-polarized light, for example, as a predetermined polarization direction, with respect to the configuration example illustrated in FIG. 5. Respective color light beams of red light, green light, and blue light are incident, for example, as S-polarized light on the first region-division wavelength selective wave plate 51. In FIG. 13, the pre-polarizer 50 is configured to transmit only S-polarized light, for example, and to reflect light in a polarization direction other than the S-polarized light, for example. In FIG. 13, for example, the first region-division wavelength selective wave plate 51 is configured to rotate polarized light of the red light beam by 90 deg. in all regions and not to rotate polarized light of the green light beam in all regions. In addition, in FIG. 13, for example, the first region-division wavelength selective wave plate 51 is configured to rotate polarized light of the blue light beam by 90 deg. in the upper region (region A in FIG. 3) and not to perform rotation in the lower region (region B in FIG. 3).

The optical system according to the second embodiment includes an illumination optical system 1C in place of the illumination optical system 1A illustrated in FIG. 5. The illumination optical system 1C further includes a region-division wavelength selective mirror 190 in addition to the configuration of the illumination optical system 1A. The region-division wavelength selective mirror 190 corresponds to a specific example of the "wavelength selective reflective element" in the technology of the present disclosure.

The region-division wavelength selective mirror 190 is disposed on an optical path between the first region-division wavelength selective wave plate 51 and each of the first light valve 31 and the second light valve 32. In the configuration example of FIG. 13, the relay lens 18 includes the first lens 181 and the second lens 182. The region-division wavelength selective mirror 190 is disposed on an optical path between the first lens 181 and the second lens 182 in the relay lens 18, and is configured to bend the optical path by 90 degrees between the first lens 181 and the second lens 182.

The region-division wavelength selective mirror 190 is a wavelength selective reflective element that reduces return light of the blue light beam returning to the pre-polarizer 50 from at least one light valve of the first light valve 31 or the second light valve 32. The region-division wavelength selective mirror 190 is disposed to be inclined relative to an optical axis of the optical path between the first region-division wavelength selective wave plate 51 and each of the first light valve 31 and the second light valve 32.

Figure 14:
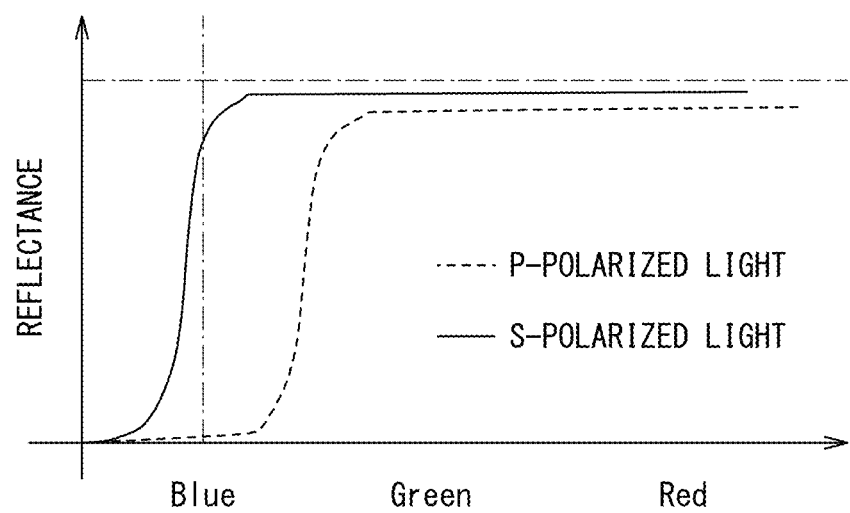
FIG. 14 is a characteristic diagram illustrating an example of reflection characteristics of a region-division wavelength selective mirror in the optical system according to the third embodiment.

FIG. 14 illustrates an example of reflection characteristics of the region-division wavelength selective mirror in the optical system according to the third embodiment. The region-division wavelength selective mirror 190 is a polarizing dichroic plate having wavelength dependency in a region corresponding to at least one divided region of the upper region (region A in FIG. 3) or the lower region (region B in FIG. 3) in the first region-division wavelength selective wave plate 51. Therefore, the region-division wavelength selective mirror 190 may be disposed in the region corresponding to at least one divided region of the upper region or the lower region in the first region-division wavelength selective wave plate 51. It is to be noted that, in a case where the region-division wavelength selective mirror 190 is disposed only in the region corresponding to one of the upper region and the lower region, a total reflection mirror is disposed in another region.

In the configuration example of FIG. 13, the region-division wavelength selective mirror 190 has characteristics with wavelength dependency as illustrated in FIG. 14 only for a region corresponding to the lower region in the first region-division wavelength selective wave plate 51. That is, in the region corresponding to the lower region in the first region-division wavelength selective wave plate 51, for example, the region-division wavelength selective mirror 190 has characteristics, for P-polarized light, to reflect the red light beam and the green light beam and to transmit the blue light beam. In addition, in the region corresponding to the lower region in the first region-division wavelength selective wave plate 51, for example, the region-division wavelength selective mirror 190 has characteristics, for S-polarized light, to reflect all of the red light beam, the green light beam, and the blue light beam. In addition, in the region corresponding to the upper region in the first region-division wavelength selective wave plate 51, for example, the region-division wavelength selective mirror 190 has characteristics to reflect all of the red light beam, the green light beam, and the blue light beam, regardless of the polarization direction. In this manner, in the region corresponding to the upper region in the first region-division wavelength selective wave plate 51, it is sufficient to reflect each color light beam regardless of the polarization direction, and thus the region-division wavelength selective mirror 180 having wavelength dependency across all the regions may be configured to be disposed only in the region corresponding to the lower region of the first region-division wavelength selective wave plate 51.

Figure 15:
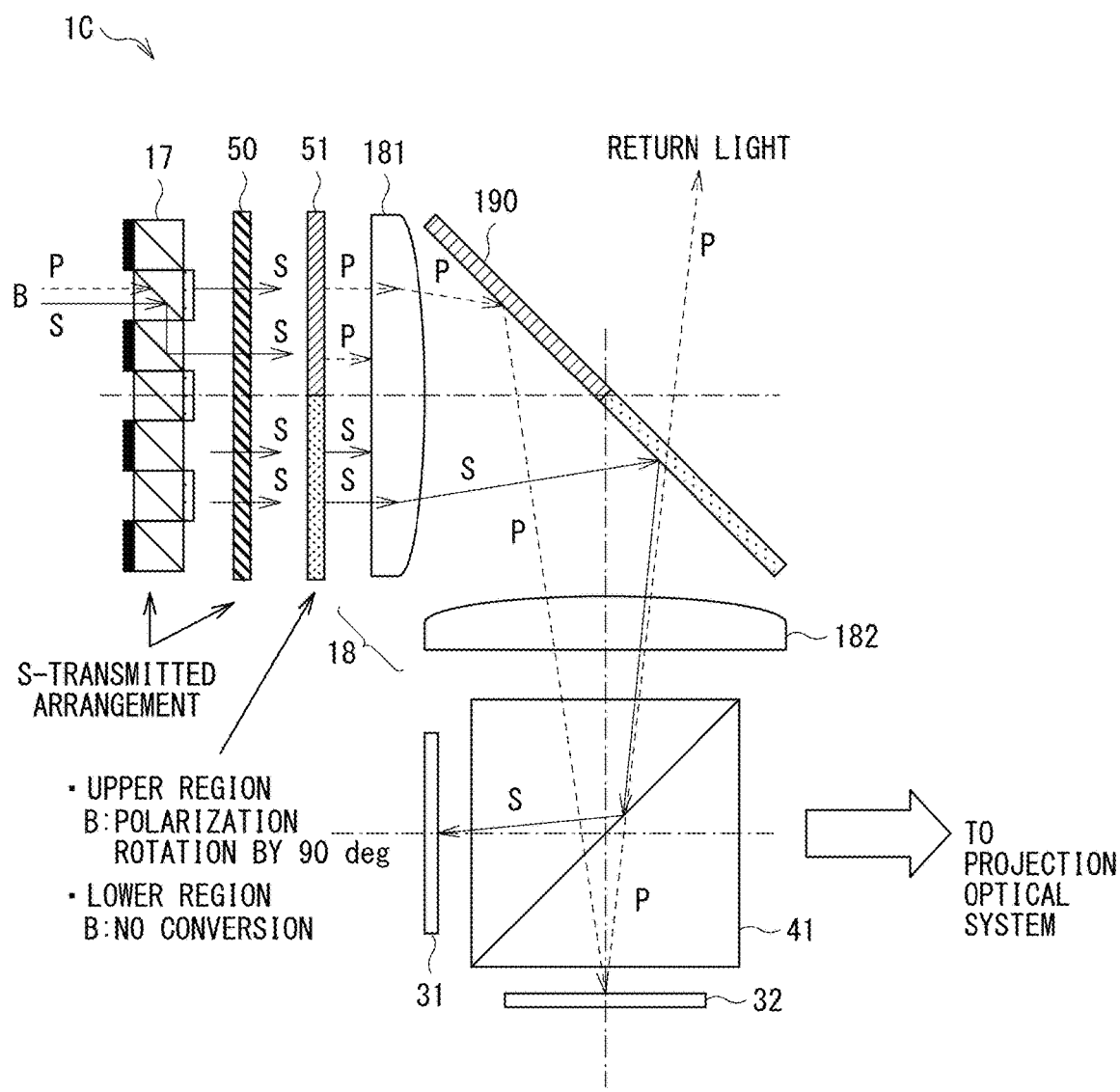
FIG. 15 is an explanatory diagram illustrating an example of an optical path of return light generated in the optical system according to the third embodiment.

FIG. 15 illustrates an example of an optical path of return light generated in the optical system according to the third embodiment.

In a region corresponding to one divided region of the upper region and the lower region in the first region-division wavelength selective wave plate 51, the region-division wavelength selective mirror 190 reflects all multiple color light beams from the one divided region. In addition, in the region corresponding to the one divided region of the upper region and the lower region in the first region-division wavelength selective wave plate 51, the region-division wavelength selective mirror 190 transmits return light of the blue light beam returning to the first region-division wavelength selective wave plate 51 from at least one light valve of the first light valve 31 or the second light valve 32. In addition, in a region corresponding to another divided region of the upper region and the lower region in the first region-division wavelength selective wave plate 51, the region-division wavelength selective mirror 190 reflects all multiple color light beams from the other divided region.

FIG. 15 illustrates a state of removal of unnecessary light caused by the return light of the blue light beam returning to the lower region after having passed through the upper region of the first region-division wavelength selective wave plate 51 described above with reference to FIG. 7. In the optical system according to the third embodiment, for example, as illustrated in FIG. 15, P-polarized blue light beam is outputted from the upper region of the first region-division wavelength selective wave plate 51. In the region corresponding to the upper region of the first region-division wavelength selective wave plate 51, the region-division wavelength selective mirror 190 reflects the P-polarized blue light beam as it is, and thus the P-polarized blue light beam propagates through the relay lens 18 while remaining as the P-polarized light to reach the second light valve 32. The second light valve 32 does not rotate polarized light during black display; thus, the blue light beam is reflected by the second light valve 32 while remaining as the P-polarized light, and becomes P-polarized return light returning to the lower region of the first region-division wavelength selective wave plate 51. Here, the region-division wavelength selective mirror 190 having characteristics to reflect the P-polarized blue light beam is disposed in the region corresponding to the lower region of the first region-division wavelength selective wave plate 51, and thus the return light of the blue light beam does not reach the lower region of the first region-division wavelength selective wave plate 51, but is transmitted to the outside of the optical path. This removes unnecessary light caused by the return light of the P-polarized blue light beam returning to the lower region. It is to be noted that, in the region corresponding to the lower region of the first region-division wavelength selective wave plate 51 in the region-division wavelength selective mirror 190, the blue light beam is reflected for S-polarized light to reach the first light valve 31. In addition, the region-division wavelength selective mirror 190 functions as a total reflection mirror for the red light beam and the green light beam regardless of polarization, and thus the red light beam and the green light beam reach the first light valve 31 or the second light valve 32 unproblematically. This makes it possible to selectively remove only the P-polarized blue light beam to be unnecessary light.

Other configurations, actions, and effects may be substantially similar to those in the optical system according to the first embodiment described above.

4. Fourth Embodiment

Next, description is given of an optical system according to a fourth embodiment of the present disclosure. It is to be noted that, in the following, components substantially the same as those of the optical system according to any of the first to third embodiments described above are denoted by the same reference numerals, and descriptions thereof are omitted as appropriate.

Description is given, in the optical system according to the fourth embodiment, of a configuration to reduce generation of the unnecessary light caused by disposing of the pre-polarizer 50, similarly to the optical system according to the second embodiment.

Figure 16:
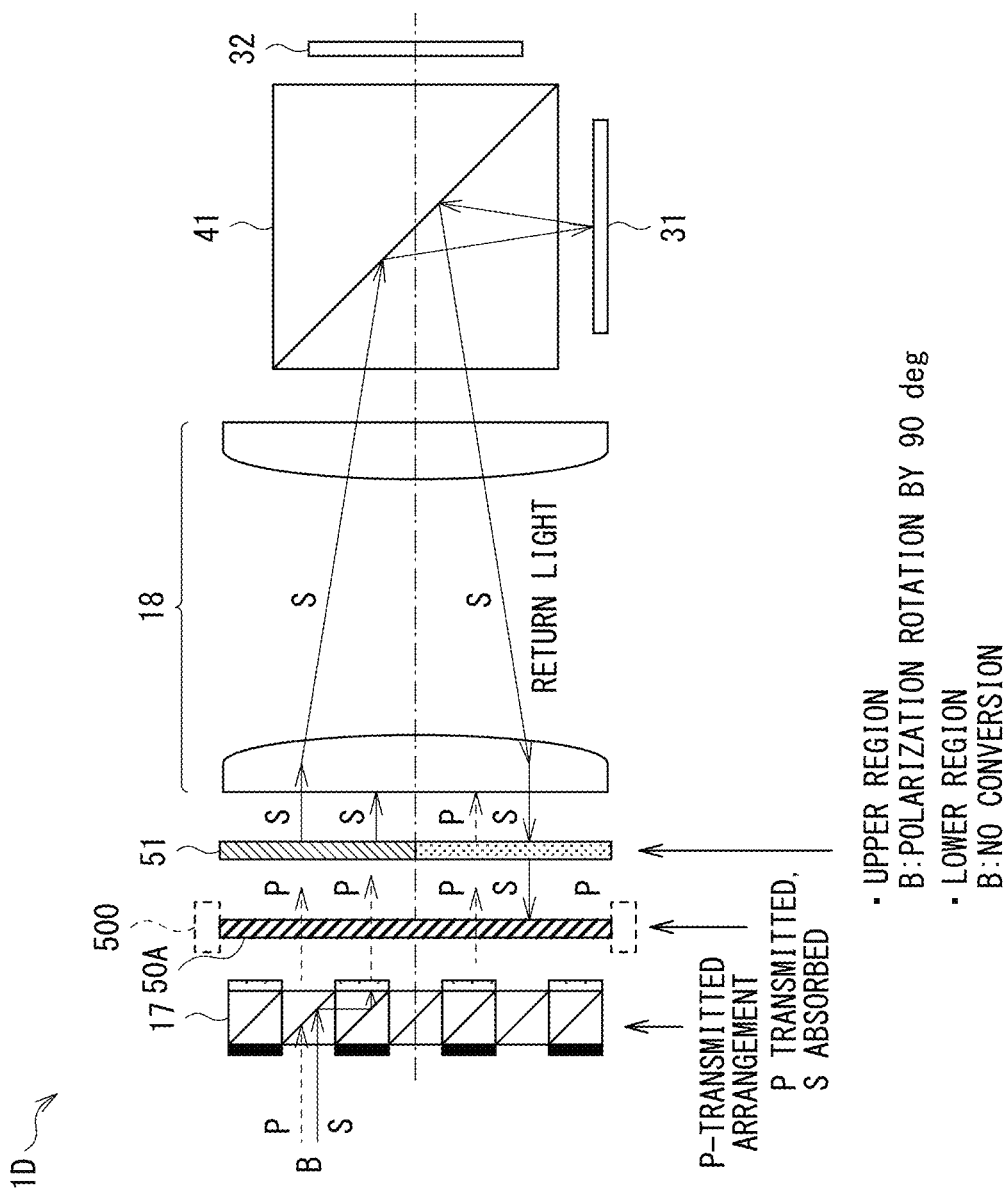
FIG. 16 is a configuration diagram schematically illustrating a configuration example of a main part of an optical system according to a fourth embodiment.

FIG. 16 schematically illustrates a configuration example of a main part of the optical system according to the fourth embodiment.

The optical system according to the fourth embodiment includes an illumination optical system 1D in place of the illumination optical system 1A illustrated in FIG. 5. The illumination optical system 1D includes a pre-polarizer 50A in place of the pre-polarizer 50, with respect to the configuration of the illumination optical system 1A. The pre-polarizer 50A corresponds to a specific example of an "absorptive polarizer" in the technology of the present disclosure.

The pre-polarizer 50A is a broadband absorptive polarizer that absorbs return light of the blue light beam returning from at least one light valve of the first light valve 31 or the second light valve 32 via the first region-division wavelength selective wave plate 51. It is preferable to provide the pre-polarizer 50A with a cooling member 500 such as a heatsink in order to cool the pre-polarizer 50A because of being the absorptive polarizer.

It is to be noted that FIG. 16 only illustrates a configuration of a main part required for description. In addition, similarly to the configuration example illustrated in FIG. 5, FIG. 16 exemplifies a case where the PS converter 17 aligns incident light with P-polarized light as a predetermined polarization direction. Respective color light beams of red light, green light, and blue light are incident as P-polarized light on the first region-division wavelength selective wave plate 51. In FIG. 16, the pre-polarizer 50A is configured to transmit only P-polarized light and to absorb light in a polarization direction other than the P-polarized light. In FIG. 16, the first region-division wavelength selective wave plate 51 is configured to rotate polarized light of the blue light beam by 90 deg. in the upper region (region A in FIG. 3) and not to perform rotation in the lower region (region B in FIG. 3).

FIG. 16 illustrates an optical path of return light of the blue light beam returning to the lower region after having passed through the upper region of the first region-division wavelength selective wave plate 51. The first region-division wavelength selective wave plate 51 rotates polarized light for the blue light beam in the upper region, and thus a S-polarized blue light beam is outputted from the upper region of the first region-division wavelength selective wave plate 51. The S-polarized blue light beam passes through the relay lens 18 while remaining as the S-polarized light to reach the first light valve 31 via the SBS 41. The first light valve 31 does not rotate polarized light during black display; thus, the blue light beam is reflected by the first light valve 31 while remaining as the S-polarized light, and becomes S-polarized return light returning to the lower region of the first region-division wavelength selective wave plate 51. The first region-division wavelength selective wave plate 51 does not rotate polarized light for the blue light beam in the lower region, and thus the S-polarized return light reaches the pre-polarizer 50A while remaining as the S-polarized light. The pre-polarizer 50A is configured to transmit the P-polarized light and to absorb the S-polarized light, and thus the S-polarized return light is absorbed by the pre-polarizer 50 in the lower region, whereby no unnecessary light is generated.

In addition, the first region-division wavelength selective wave plate 51 does not rotate polarized light for the blue light beam in the lower region, and thus a P-polarized blue light beam is outputted from the lower region of the first region-division wavelength selective wave plate 51. The P-polarized blue light beam passes through the relay lens 18 while remaining as the P-polarized light to reach the second light valve 32 via the PBP 41. The second light valve 32 does not rotate polarized light during black display; thus, the blue light beam is reflected by the second light valve 32 while remaining as the P-polarized light, and becomes P-polarized return light returning to the upper region of the first region-division wavelength selective wave plate 51. The first region-division wavelength selective wave plate 51 rotates polarized light for the blue light beam in the upper region, and thus the P-polarized return light becomes S-polarized light to reach the pre-polarizer 50A. The pre-polarizer 50A is configured to transmit the P-polarized light and to absorb the S-polarized light, and thus the S-polarized return light is absorbed by the pre-polarizer 50A in the upper region, whereby no unnecessary light is generated.

In this manner, in the optical system according to the fourth embodiment, it is possible to reduce the generation of unnecessary light for both of the S-polarized return light and the P-polarized return light.

Other configurations, actions, and effects may be substantially similar to those in the optical system according to the first embodiment described above.

5. Fifth Embodiment

Next, description is given of an optical system according to a fifth embodiment of the present disclosure. It is to be noted that, in the following, components substantially the same as those of the optical system according to any of the first to fourth embodiments described above are denoted by the same reference numerals, and descriptions thereof are omitted as appropriate.

The description has been given, in the first embodiment described above, of the case where a region-division pattern of the first region-division wavelength selective wave plate 51 has a divided structure divided into halves of an upper portion and a lower portion; however, the region-division pattern of the first region-division wavelength selective wave plate 51 is not limited to the divided structure divided into halves of the upper portion and the lower portion, but may have various divided structures. Likewise, a region-division pattern of the second region-division wavelength selective wave plate 52 is not limited to the divided structure divided into halves of the upper portion and the lower portion as well, but may have various divided structures. It is sufficient for the first region-division wavelength selective wave plate 51 and the second region-division wavelength selective wave plate 52 to have region-division patterns of being conjugate to each other. Hereinafter, description is given of modification examples of the region-division pattern for the first region-division wavelength selective wave plate 51.

Figure 17:
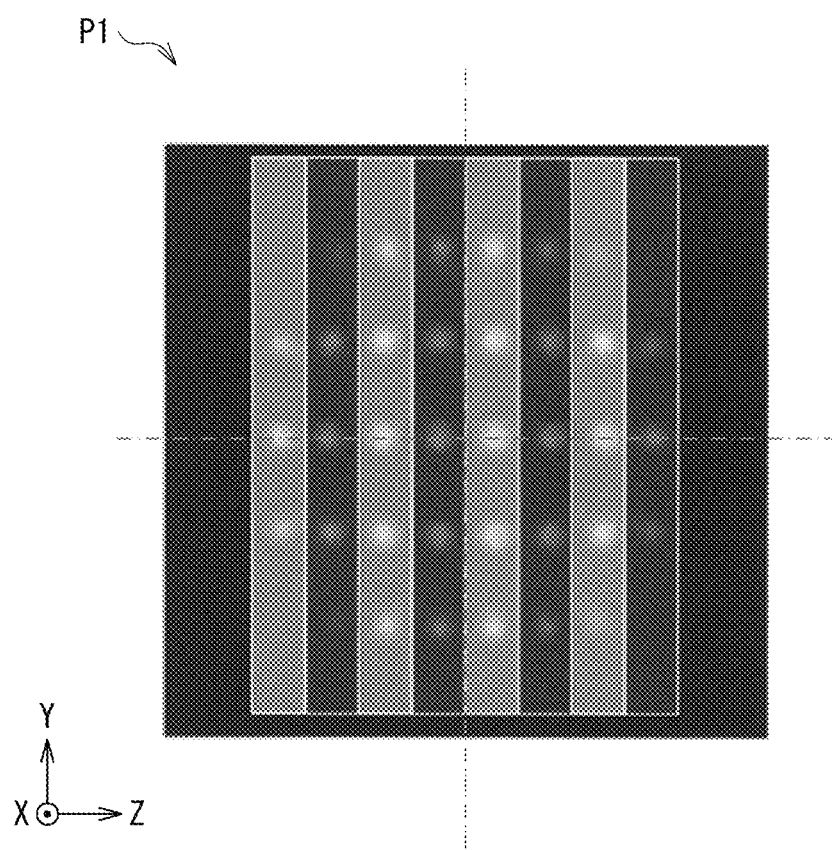
FIG. 17 is an explanatory diagram schematically illustrating a first modification example of a region-division pattern of the first region-division wavelength selective wave plate.

FIG. 17 schematically illustrates a first modification example of the region-division pattern of the first region-division wavelength selective wave plate 51. As illustrated in FIG. 17, for example, the first region-division wavelength selective wave plate 51 may have a configuration in which multiple strip-shaped first divided regions having polarization characteristics corresponding to the region A in FIG. 3 and multiple strip-shaped second divided regions having polarization characteristics corresponding to the region B in FIG. 3 are alternately arranged.

Figure 18:
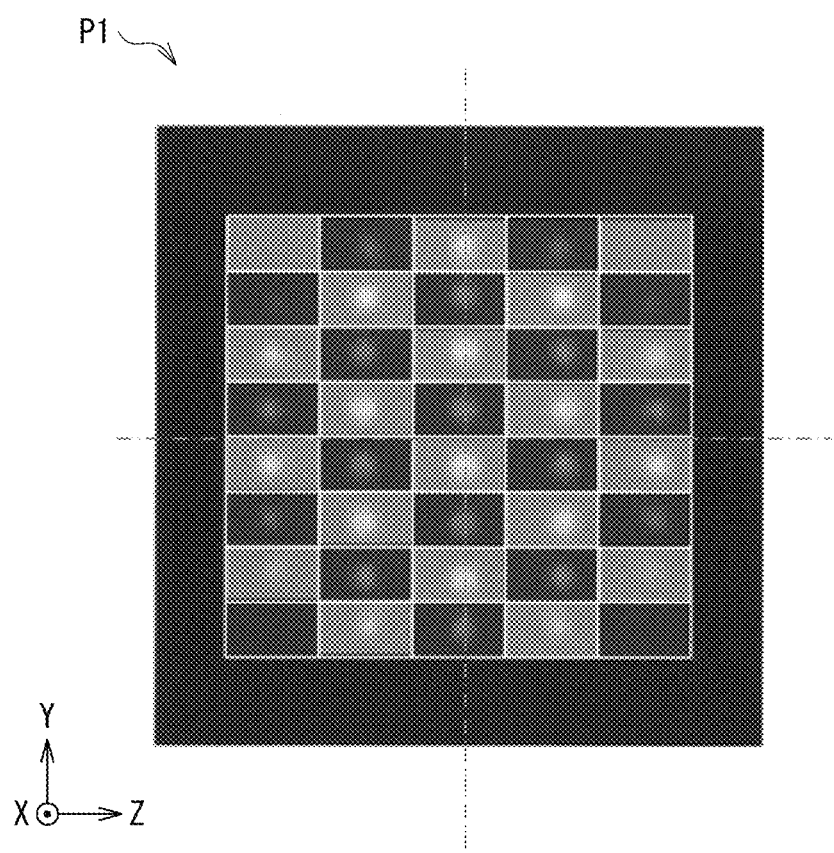
FIG. 18 is an explanatory diagram schematically illustrating a second modification example of the region-division pattern of the first region-division wavelength selective wave plate.

FIG. 18 schematically illustrates a second modification example of the region-division pattern of the first region-division wavelength selective wave plate 51. As illustrated in FIG. 18, for example, the first region-division wavelength selective wave plate 51 may have a configuration in which multiple first divided regions having polarization characteristics corresponding to the region A in FIG. 3 and multiple second divided regions having polarization characteristics corresponding to the region B in FIG. 3 are arranged in a grid manner.

Here, as described in the second embodiment, in the optical system according to the first embodiment, in a case where the pre-polarizer 50 is disposed as in the configuration example illustrated in FIG. 5, there is a possibility that the return light from the first light valve 31 or the second light valve 32 may become unnecessary light reflected by the pre-polarizer 50 and returning again as illumination light to the first light valve 31 or the second light valve 32. In this case, in the first region-division wavelength selective wave plate 51, the position of a light beam in an outward path to be the original of the return light and the position of a light beam in a return path to be the return light become positions of point symmetry to each other on the principle of reflection. In addition, the unnecessary light is generated due to mutual difference in polarization characteristics between the light beam position in the outward path and the light beam position in the return path, in the first region-division wavelength selective wave plate 51. Therefore, it is preferable for the first region-division wavelength selective wave plate 51 to have a divided structure in which the first divided region and the second divided region are point-symmetrically distributed in at least a portion of the region. In order to reduce the unnecessary light, it is preferable for the first region-division wavelength selective wave plate 51 to have a divided structure in which the first divided region and the second divided region are point-symmetrically distributed in at least half or more of the region. Hereinafter, FIGS. 19 to 22 each illustrate an example of having the divided structure in which the first divided region and the second divided region are point-symmetrically distributed in at least half or more of the region of the first region-division wavelength selective wave plate 51.

Figure 19:
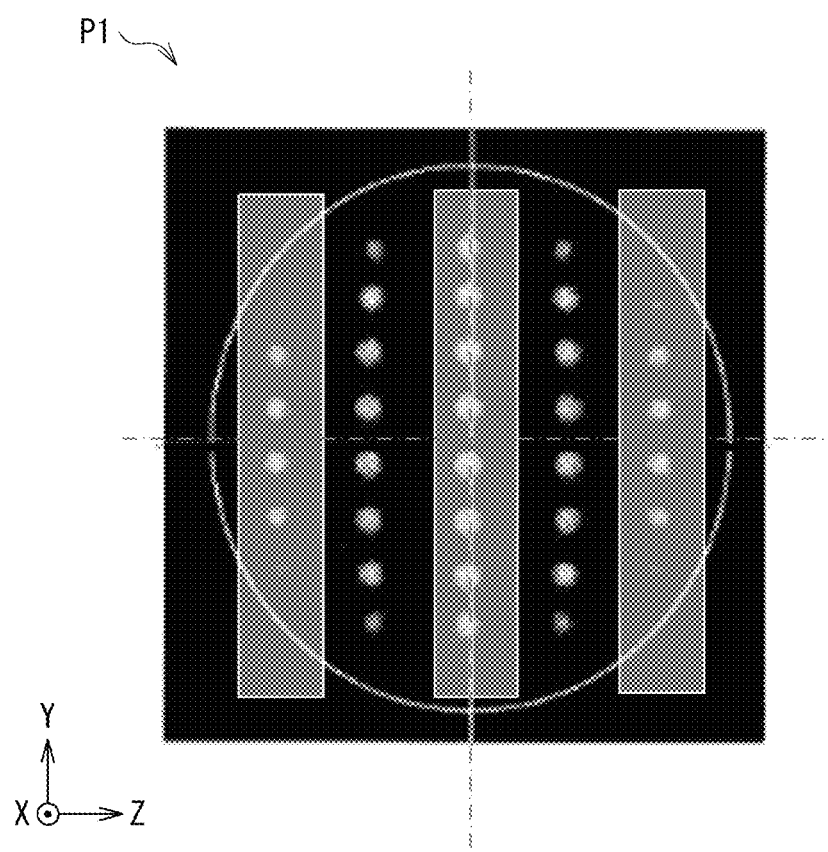
FIG. 19 is an explanatory diagram schematically illustrating a third modification example of the region-division pattern of the first region-division wavelength selective wave plate.

FIG. 19 schematically illustrates a third modification example of the region-division pattern of the first region-division wavelength selective wave plate 51. FIG. 19 illustrates a divided structure in which the first divided region and the second divided region are point-symmetrically distributed across all the regions, with respect to the divided structure in FIG. 17.

Figure 20:
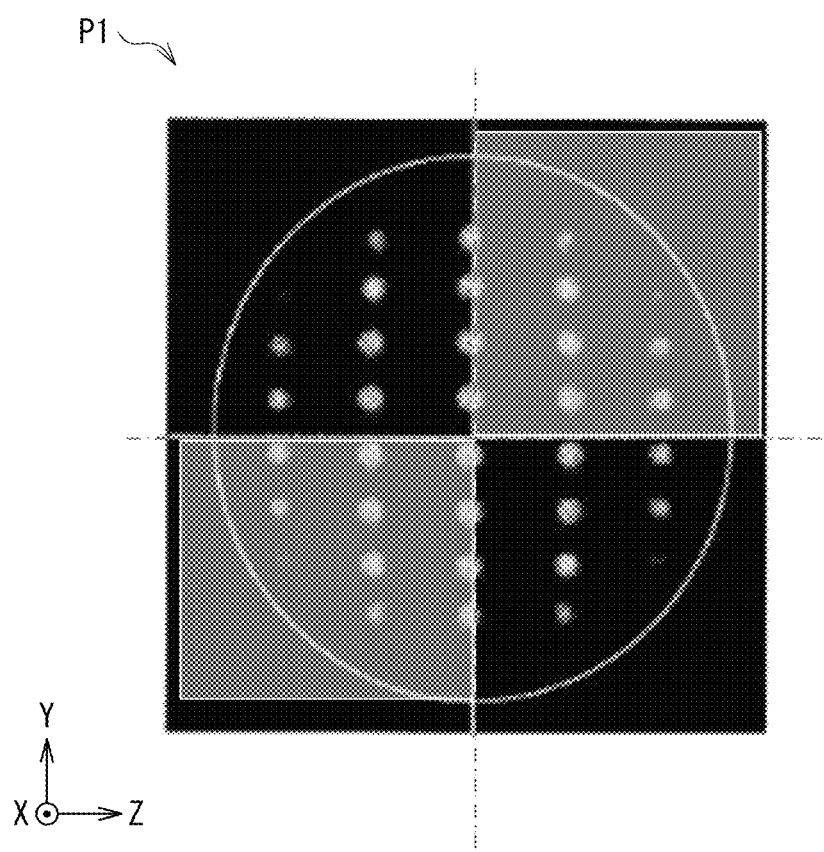
FIG. 20 is an explanatory diagram schematically illustrating a fourth modification example of the region-division pattern of the first region-division wavelength selective wave plate.

FIG. 20 schematically illustrates a fourth modification example of the region-division pattern of the first region-division wavelength selective wave plate 51. FIG. 20 illustrates a divided structure in which the first divided region and the second divided region are point-symmetrically distributed across all the regions, with respect to the divided structure in FIG. 18.

Figure 21:
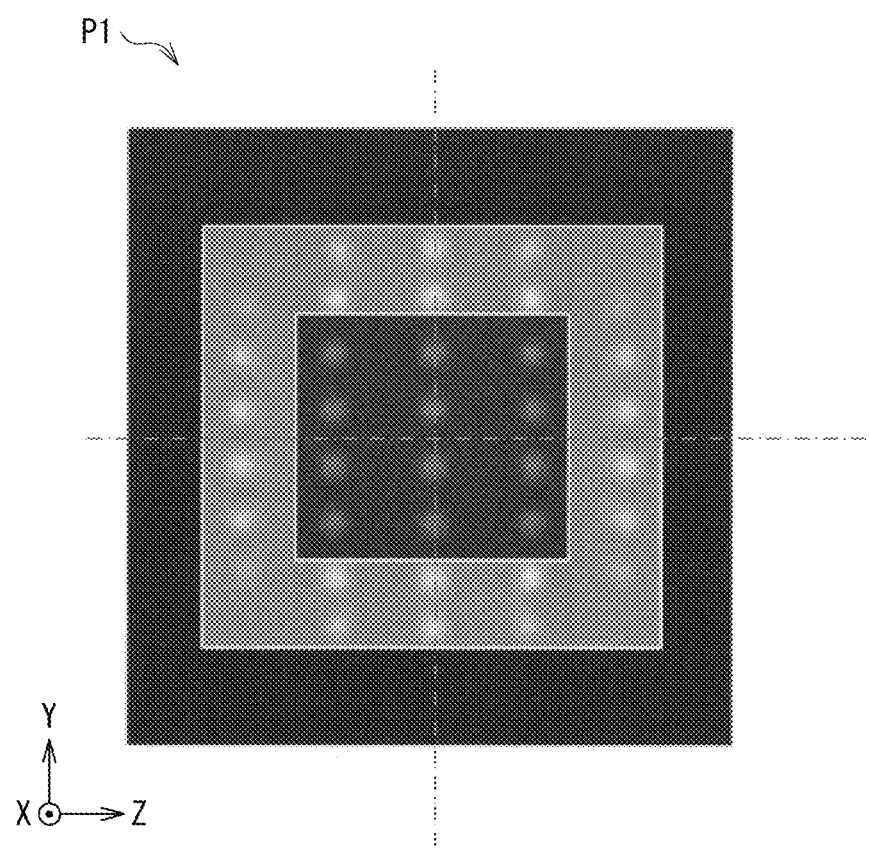
FIG. 21 is an explanatory diagram schematically illustrating a fifth modification example of the region-division pattern of the first region-division wavelength selective wave plate.

FIG. 21 schematically illustrates a fifth modification example of the region-division pattern of the first region-division wavelength selective wave plate 51. FIG. 21 illustrates a divided structure in which the first divided region and the second divided region are point-symmetrically distributed across all the regions by causing polarization characteristics of a center region and polarization characteristics of an outer region to be different from each other.

Figure 22:
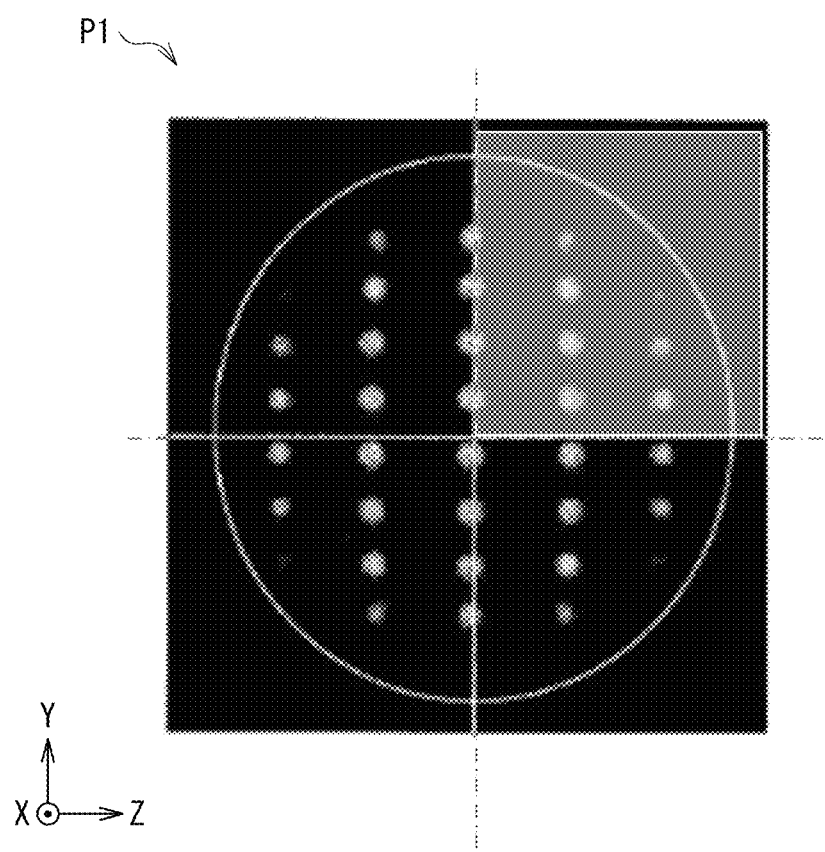
FIG. 22 is an explanatory diagram schematically illustrating a sixth modification example of the region-division pattern of the first region-division wavelength selective wave plate.

FIG. 22 schematically illustrates a sixth modification example of the region-division pattern of the first region-division wavelength selective wave plate 51. There is illustrated a divided structure in which the first divided region and the second divided region are point-symmetrically distributed for substantially half or more of the region, with respect to the divided structure in FIG. 20.

It is to be noted that there is preferably less boundary between the first divided region and the second divided region in terms of manufacture. In addition, also in terms of optical performance, there is preferably less boundary between the first divided region and the second divided region. For this reason, for example, the divided structure in FIG. 20 is more preferable.

Allowing the divided structure of the first region-division wavelength selective wave plate 51 to be the point-symmetric divided structure for at least half or more of the region as illustrated, for example, in FIGS. 19 to 22 makes it possible to reduce the generation of unnecessary light without adopting the configuration of the optical systems according to the second to fourth embodiments described above.

Other configurations, actions, and effects may be substantially similar to those in the optical system according to the first embodiment described above.

6. Other Embodiments

The technology according to the present disclosure is not limited to the descriptions of the respective embodiments described above, and may be modified in a wide variety of ways.

For example, the present technology may also have the following configurations.

According to the present technology having the following configuration, the first polarization rotation element including the first divided region and the second divided region having polarization characteristics different from each other is disposed at the first pupil position in the first optical system, and further the polarizer that reduces light in a polarization direction other than a predetermined polarization direction included in light outputted from the polarization conversion element is disposed inside the first optical system, thus making it possible to achieve an improvement in contrast.

(1)

An optical system including:

a first optical system including a polarization conversion element that aligns a polarization direction of light including multiple color light beams with a predetermined polarization direction, the first optical system generating illumination light including the multiple color light beams;

a first polarization rotation element which is disposed at a first pupil position inside the first optical system and includes a first divided region and a second divided region, and in which the first divided region and the second divided region have polarization characteristics different from each other with respect to a first color light beam of the multiple color light beams outputted from the polarization conversion element;

a polarizer disposed between the polarization conversion element and the first polarization rotation element inside the first optical system, the polarizer reducing light in a polarization direction other than the predetermined polarization direction included in light outputted from the polarization conversion element; and multiple light valves each illuminated by at least the first color light beam of the multiple color light beams included in the illumination light generated by the first optical system.

(2)

The optical system according to (1), further including a wavelength selective reflective element disposed on an optical path between the first polarization rotation element and the multiple light valves, the wavelength selective reflective element reducing return light of the first color light beam returning to the polarizer from at least one light valve of the multiple light valves.

(3)

The optical system according to (2), in which the wavelength selective reflective element is disposed to be inclined relative to an optical axis of the optical path between the first polarization rotation element and the multiple light valves.

(4)

The optical system according to any one of (2) or (3), in which the wavelength selective reflective element is disposed in a region corresponding to at least one divided region of the first divided region or the second divided region in the first polarization rotation element.

(5)

The optical system according to (4), in which, in the region corresponding to the one divided region of the first divided region and the second divided region, the wavelength selective reflective element transmits all of the multiple color light beams from the one divided region and reflects the return light of the first color light beam returning to the polarizer from the at least one light valve of the multiple light valves.

(6)

The optical system according to (5), in which, in a region corresponding to another divided region of the first divided region and the second divided region, the wavelength selective reflective element transmits all of the multiple color light beams from the other divided region.

(7)

The optical system according to (4), in which, in the region corresponding to the one divided region of the first divided region and the second divided region, the wavelength selective reflective element reflects all of the multiple color light beams from the one divided region and transmits the return light of the first color light beam returning to the polarizer from the at least one light valve of the multiple light valves.

(8)

The optical system according to (7), in which, in a region corresponding to another divided region of the first divided region and the second divided region, the wavelength selective reflective element reflects all of the multiple color light beams from the other divided region.

(9)

The optical system according to (1), in which the polarizer includes an absorptive polarizer that absorbs return light of the first color light beam returning from at least one light valve of the multiple light valves via the first polarization rotation element.

(10)

The optical system according to (9), further including a cooling member that cools the absorptive polarizer.

(11)

The optical system according to (1), in which the first polarization rotation element has, in at least a portion of a region, a divided structure in which the first divided region and the second divided region are point-symmetrically distributed.

(12)

The optical system according to (11), in which the first polarization rotation element has, in at least half or more of the region, the divided structure in which the first divided region and the second divided region are point-symmetrically distributed.

(13)

The optical system according to any one of (1) to (12), further including:

a second optical system on which the multiple color light beams after having been modulated by the multiple light valves are incident; and a second polarization rotation element which is disposed at a second pupil position conjugate to the first pupil position inside the second optical system and includes a third divided region and a fourth divided region, and in which the third divided region and the fourth divided region have polarization characteristics different from each other with respect to the first color light beam of the multiple color light beams outputted from the multiple light valves.

(14)

The optical system according to (13), in which the first divided region and the second divided region in the first optical element and the third divided region and the fourth divided region in the second optical element are conjugate to each other, respectively.

(15)

The optical system according to (13) or (14), in which the second optical system includes a projection optical system that projects an image generated by the multiple light valves onto a projection plane.

(16)

The optical system according to any one of (1) to (15), in which the multiple light valves include a first light valve and a second light valve, the multiple color light beams include first to third color light beams, the first color light beam is incident on the first light valve and the second light valve, the second color light beam is incident on one of the first light valve and the second light valve, and the third color light beam is incident on another of the first light valve and the second light valve.

This application claims the benefit of Japanese Priority Patent Application JP2020-8634 filed with the Japan Patent Office on Jan. 22, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. An optical system, comprising:

a first optical system including a polarization conversion element that aligns a polarization direction of light including multiple color light beams with a predetermined polarization direction, the first optical system generating illumination light including the multiple color light beams;

a first polarization rotation element which is disposed at a first pupil position inside the first optical system and includes a first divided region and a second divided region, and in which the first divided region and the second divided region have polarization characteristics different from each other with respect to a first color light beam of the multiple color light beams outputted from the polarization conversion element;

a polarizer disposed between the polarization conversion element and the first polarization rotation element inside the first optical system, the polarizer reducing light in a polarization direction other than the predetermined polarization direction of the multiple color light beams included in light outputted from the polarization conversion element; and multiple light valves each illuminated by at least the first color light beam of the multiple color light beams included in the illumination light generated by the first optical system.

2. The optical system according to claim 1, further comprising a wavelength selective reflective element disposed on an optical path between the first polarization rotation element and the multiple light valves, the wavelength selective reflective element reducing return light of the first color light beam returning to the polarizer from at least one light valve of the multiple light valves.

3. The optical system according to claim 2, wherein the wavelength selective reflective element is disposed to be inclined relative to an optical axis of the optical path between the first polarization rotation element and the multiple light valves.

4. The optical system according to claim 2, wherein the wavelength selective reflective element is disposed in a region corresponding to at least one divided region of the first divided region or the second divided region in the first polarization rotation element.

5. The optical system according to claim 4, wherein, in the region corresponding to the one divided region of the first divided region and the second divided region, the wavelength selective reflective element transmits all of the multiple color light beams from the one divided region and reflects the return light of the first color light beam returning to the polarizer from the at least one light valve of the multiple light valves.

6. The optical system according to claim 5, wherein, in a region corresponding to another divided region of the first divided region and the second divided region, the wavelength selective reflective element transmits all of the multiple color light beams from the other divided region.

7. The optical system according to claim 4, wherein, in the region corresponding to the one divided region of the first divided region and the second divided region, the wavelength selective reflective element reflects all of the multiple color light beams from the one divided region and transmits the return light of the first color light beam returning to the polarizer from the at least one light valve of the multiple light valves.

8. The optical system according to claim 7, wherein, in a region corresponding to another divided region of the first divided region and the second divided region, the wavelength selective reflective element reflects all of the multiple color light beams from the other divided region.

9. The optical system according to claim 1, wherein the polarizer comprises an absorptive polarizer that absorbs return light of the first color light beam returning from at least one light valve of the multiple light valves via the first polarization rotation element.

10. The optical system according to claim 9, further comprising a cooling member that cools the absorptive polarizer.

11. The optical system according to claim 1, wherein the first polarization rotation element has, in at least a portion of a region, a divided structure in which the first divided region and the second divided region are point-symmetrically distributed.

12. The optical system according to claim 11, wherein the first polarization rotation element has, in at least half or more of the region, the divided structure in which the first divided region and the second divided region are point-symmetrically distributed.

13. The optical system according to claim 1, further comprising:
   a second optical system on which the multiple color light beams after having been modulated by the multiple light valves are incident; and
   a second polarization rotation element which is disposed at a second pupil position conjugate to the first pupil position inside the second optical system and includes a third divided region and a fourth divided region, and in which the third divided region and the fourth divided region have polarization characteristics different from each other with respect to the first color light beam of the multiple color light beams outputted from the multiple light valves.

14. The optical system according to claim 13, wherein the first divided region and the second divided region in the first optical element and the third divided region and the fourth divided region in the second optical element are conjugate to each other, respectively.

15. The optical system according to claim 13, wherein the second optical system comprises a projection optical system that projects an image generated by the multiple light valves onto a projection plane.

16. The optical system according to claim 1, wherein
   the multiple light valves include a first light valve and a second light valve,
   the multiple color light beams include first to third color light beams,
   the first color light beam is incident on the first light valve and the second light valve,
   the second color light beam is incident on one of the first light valve and the second light valve, and
   the third color light beam is incident on another of the first light valve and the second light valve.

* * * * *